United States Patent
Okada et al.

(10) Patent No.: US 7,770,207 B2
(45) Date of Patent: Aug. 3, 2010

(54) SYSTEM, APPARATUS, PROGRAM, AND METHOD FOR AUTHENTICATION

(75) Inventors: Koji Okada, Tokyo (JP); Tatsuro Ikeda, Fuchu (JP); Hidehisa Takamizawa, Fuchu (JP)

(73) Assignees: Kabushiki Kaisha Toshiba, Tokyo (JP); Toshiba Solutions Corp., Tokyo (JP)

( * ) Notice: Subject to any disclaimer, the term of this patent is extended or adjusted under 35 U.S.C. 154(b) by 1177 days.

(21) Appl. No.: 11/165,276

(22) Filed: Jun. 24, 2005

(65) Prior Publication Data
US 2006/0005025 A1    Jan. 5, 2006

(30) Foreign Application Priority Data
Jun. 25, 2004    (JP) .............................. 2004-187239

(51) Int. Cl.
*H04L 9/00* (2006.01)
*G09C 1/00* (2006.01)
(52) U.S. Cl. ............................ 726/2; 713/168; 713/170
(58) Field of Classification Search ................. 713/170, 713/173
See application file for complete search history.

(56) References Cited

U.S. PATENT DOCUMENTS

| | | | |
|---|---|---|---|
| 5,818,936 A | 10/1998 | Mashayekhi | |
| 6,178,511 B1 | 1/2001 | Cohen et al. | |
| 7,207,058 B2 * | 4/2007 | Barrett | 726/4 |
| 2002/0071567 A1 | 6/2002 | Kurn et al. | |
| 2002/0104006 A1 | 8/2002 | Boate et al. | |
| 2004/0088587 A1 * | 5/2004 | Ramaswamy et al. | 713/202 |
| 2004/0172535 A1 * | 9/2004 | Jakobsson et al. | 713/168 |
| 2005/0132235 A1 * | 6/2005 | Teunen | 713/202 |

FOREIGN PATENT DOCUMENTS

| | | |
|---|---|---|
| CN | 1430417 | 7/2003 |
| JP | 2003-143136 | 5/2003 |
| KR | 2002-0086030 | 11/2002 |
| WO | WO 2004/051585 A2 | 6/2004 |

OTHER PUBLICATIONS

Notification for Filing Opinion dated Nov. 6, 2007 in Korean Patent Application No. 10-2007-81359.
Ye Manyon, "Modern Cryptology and Application", Nov. 20, 2002, pp. 200-201 and 345-356.

(Continued)

*Primary Examiner*—Matthew B Smithers
(74) *Attorney, Agent, or Firm*—Finnegan, Henderson, Farabow, Garrett & Dunner, L.L.P.

(57) ABSTRACT

According to an aspect of the invention, a management of each authentication subprocess assures the each authentication subprocess, and assurance contents can be verified by verification side, so that trustworthiness of the whole authentication process can be improved. An authentication system includes authentication entity devices which separately execute authentication subprocesses P1 and P2 and a verification device which verifies the executed contents of each of the authentication subprocesses P1 and P2. The entity device includes a confidential information management unit which manages confidential information, an authenticator generating unit which generates an authenticator using the confidential information, and a context generating unit which generates a specific context pursuant to a specific format from the authenticator and the executed contents.

10 Claims, 23 Drawing Sheets

OTHER PUBLICATIONS

Notification for Filing Opinion dated Oct. 25, 2006, in Korean Patent Application No. 10-2005-54260.

Notification of the First Office Action dated Dec. 5, 2008 in Chinese Patent Application No. 200510079696.2.

"Technical Overview of the OASIS Securtiy Assertion Markup Language (SAML) V1.1," OASIS (May 11, 2004), pp. 1-19.

Dierks et al., "The TLS Protocol," The Internet Society (Jan. 1999), pp. 1-71.

Kent et al., "Security Architecture for the Internet Protocol," The Internet Society (Nov. 1998), pp. 1-58.

Freier et al., "The SSL Protocol," Internet Engineering Task Force (Nov. 18, 1996), pp. 1-57.

Office Action dated Jul. 6, 2009 in corresponding Canadian Patent Application No. 2,510,548 (4 pages).

Notice of Reason for Rejection dated Feb. 16, 2010, from the Japanese Patent Office in corresponding Japanese application No. 2004-187239.

* cited by examiner

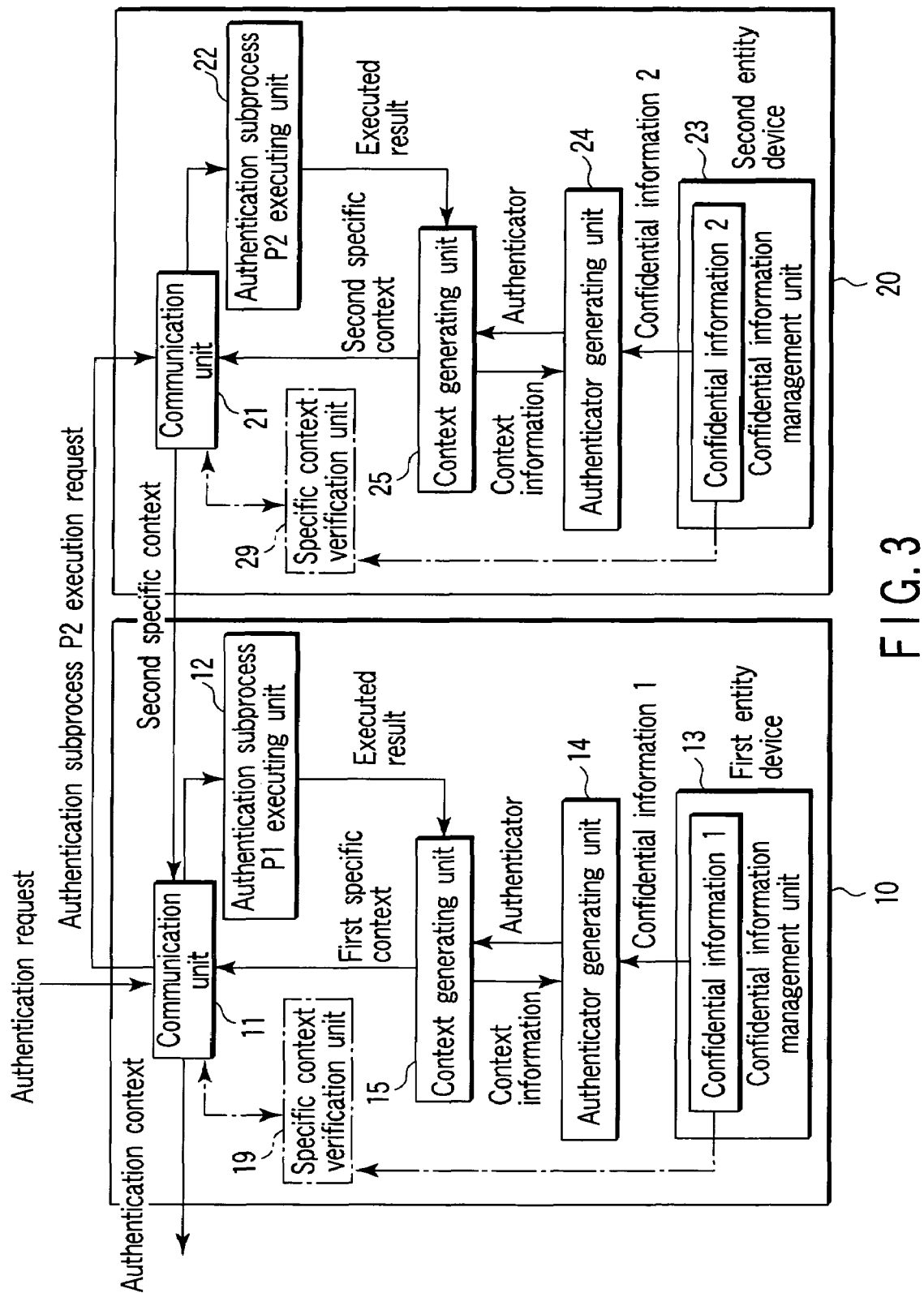
F I G. 3

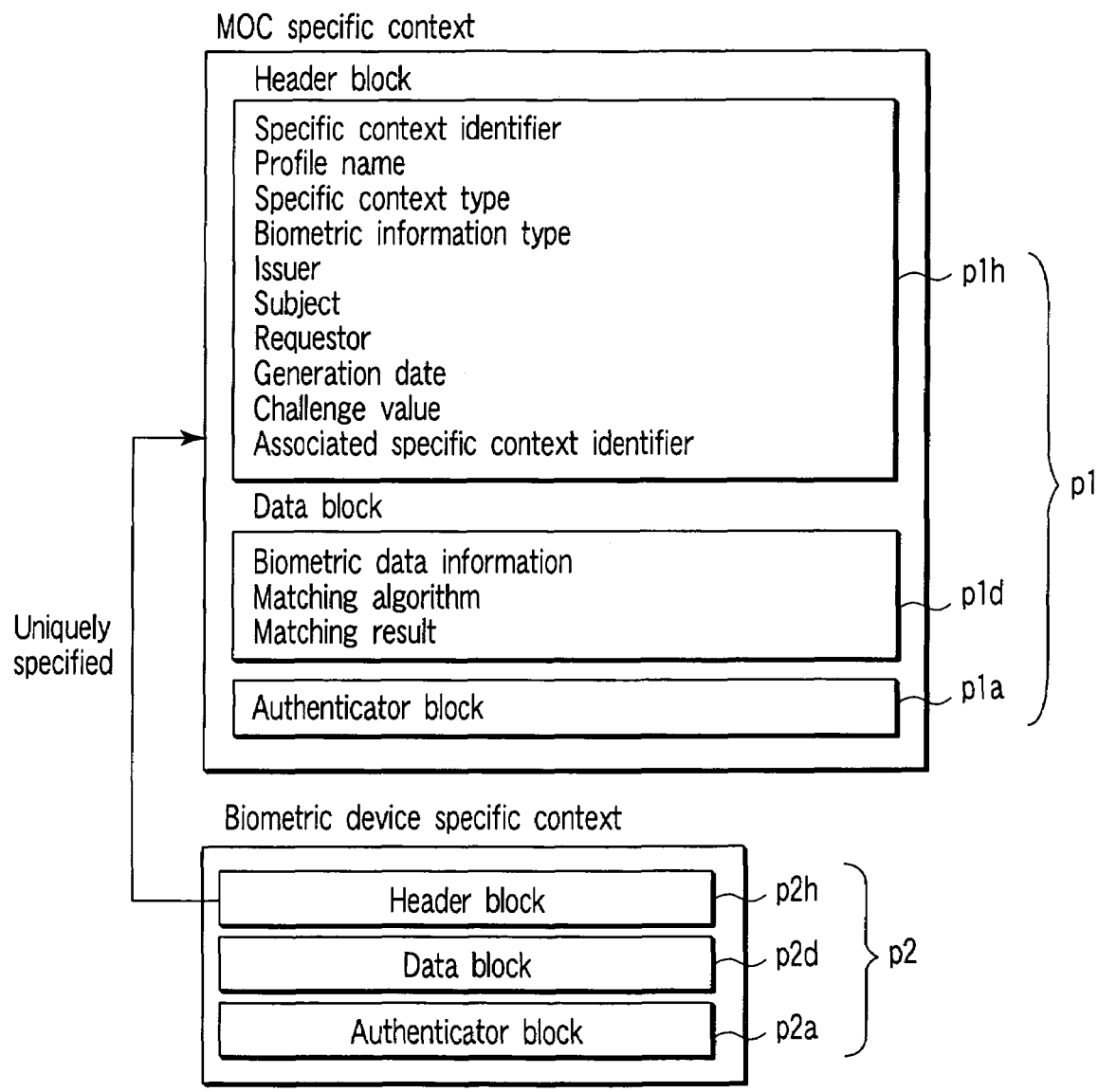
F I G. 21

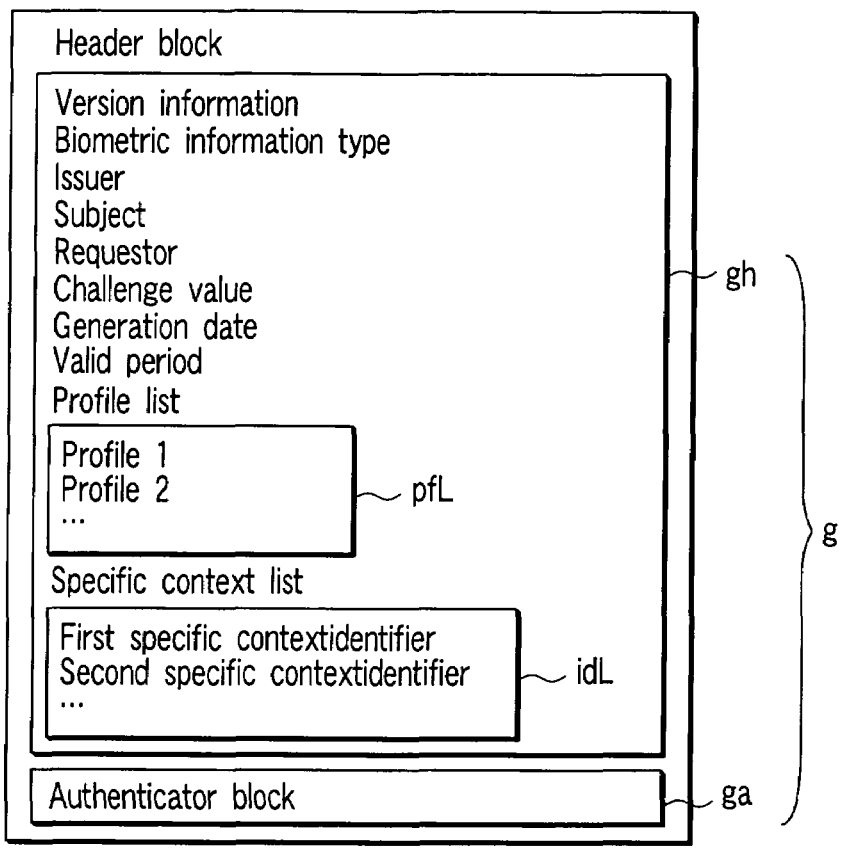
F I G. 22
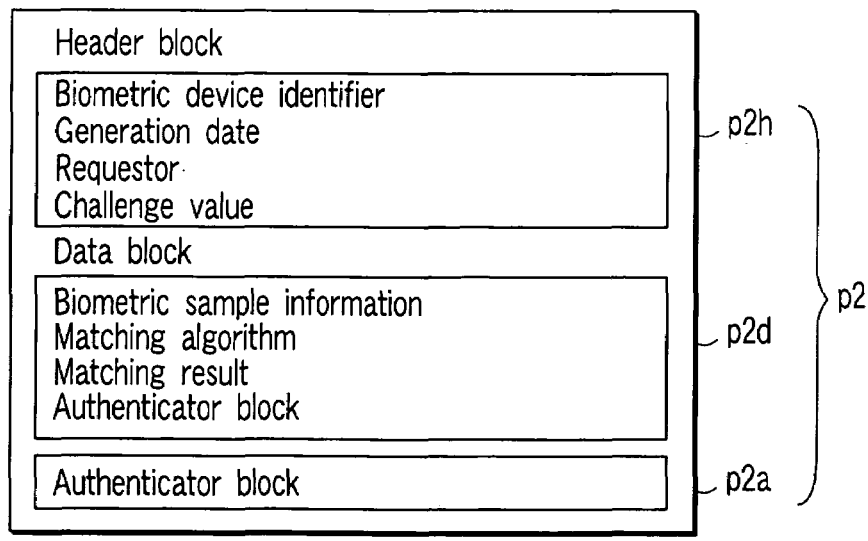
F I G. 23

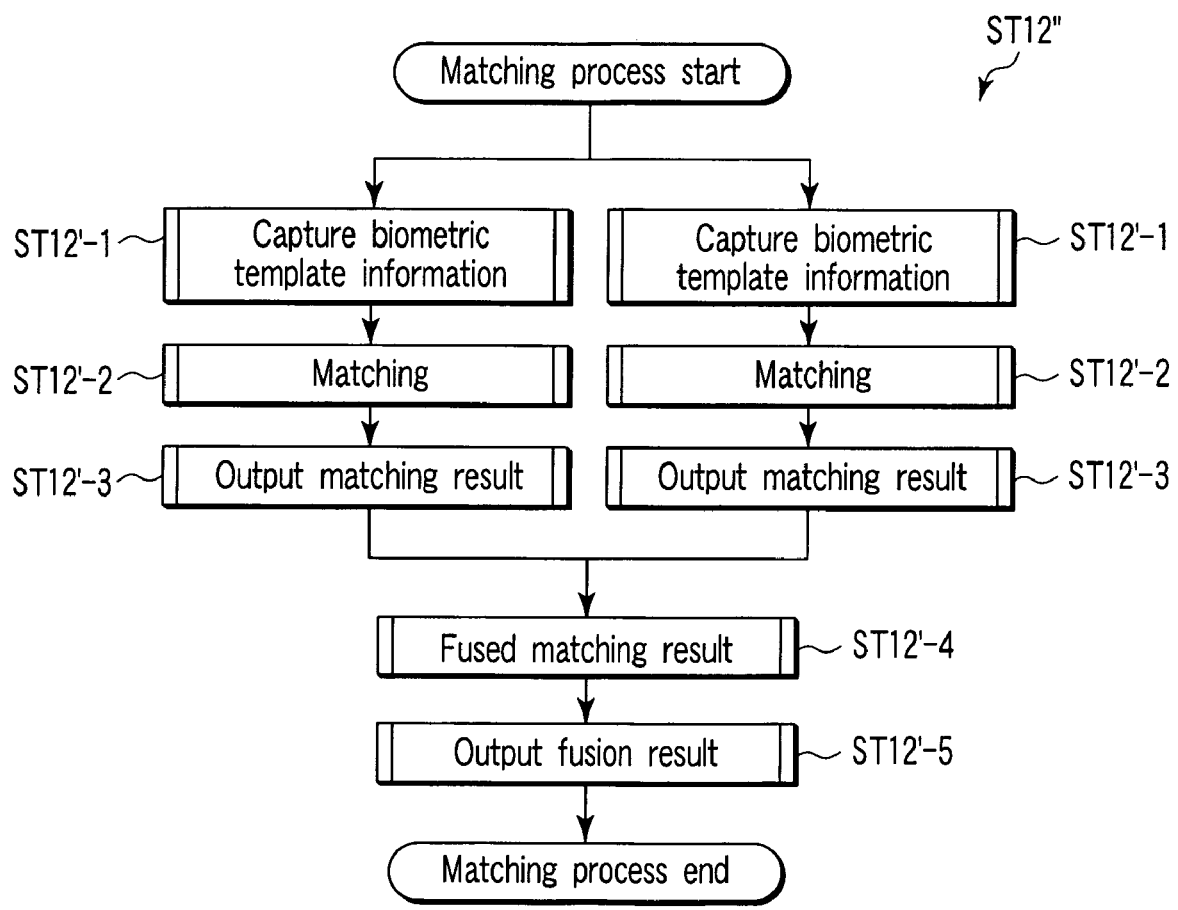
F I G. 27

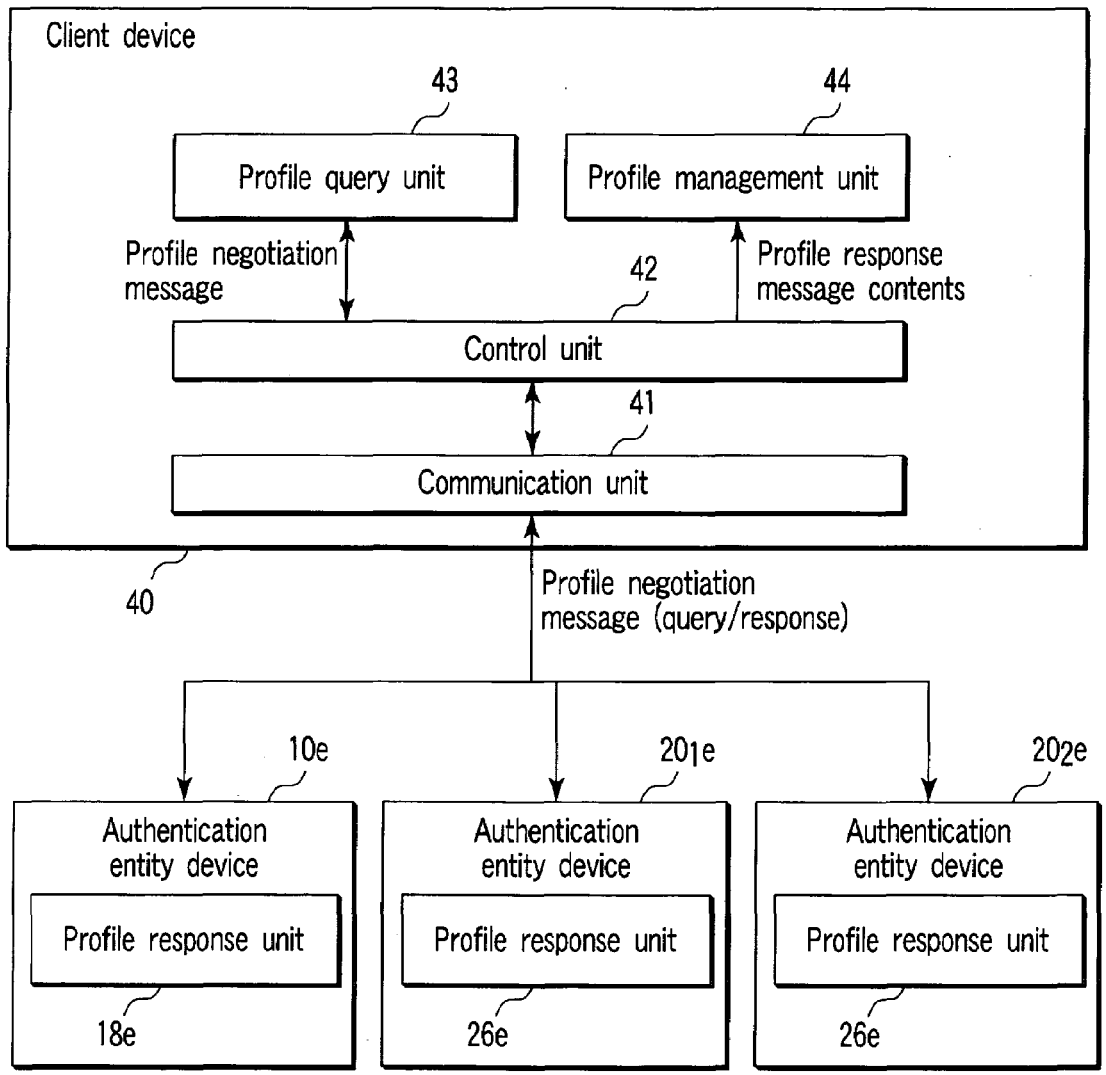
F I G. 30

SYSTEM, APPARATUS, PROGRAM, AND METHOD FOR AUTHENTICATION

CROSS-REFERENCE TO RELATED APPLICATIONS

This application is based upon and claims the benefit of priority from prior Japanese Patent Application No. 2004-187239, filed Jun. 25, 2004, the entire contents of which are incorporated herein by reference.

BACKGROUND OF THE INVENTION

1. Field of the Invention

The present invention relates to an authentication system, apparatus, program, and method for assuring a process constituting authentication to notify a verification side, and particularly to the authentication system, apparatus, program, and method in which a statement concerning the process constituting authentication can be assured by a management to which each process belongs.

2. Description of the Related Art

In communication and service via a network, authentication of a communication party is a required technical element. Recently, authentication subjects are rapidly growing from users to instrument terminals with a widespread open network environment and development of federation technologies of distributed service resources.

At the same time, an authentication means has been developed in various layers. For example, SSL (Secure Sockets Layer)/TLS (Transport Layer Security) can be cited in a session layer of an OSI seven-layer model (see [SSL3.0] A. Frier, P. Karlton, and P. Kocher, "The SSL 3.0 Protocol", Netscape Communications Corp., Nov. 18, 1996. and [TLS1.0] T. Dierks, C. Allen, "The TLS Protocol Version 1.0", RFC2246, Jan. 1999, http://www.ietf.org/rfc/rfc2246.txt). The SSL/TLS becomes widespread as a standard secure communication protocol, because the SSL/TLS can provide the transparent secure communication to a higher layer. For an authentication mechanism, the SSL/TLS supports server authentication and client authentication based on a public key certificate.

IPsec can be cited as an example of secure communication for IP (Internet Protocol) which is a communication protocol in the network layer of the OSI seven-layer model (see [IPsec] S. Kent, R. Atkinson, "Security Architecture for the Internet Protocol", Nov. 1998, <http://www.ietf.org/rfc/rfc2401.txt>). In the IPsec, authentication and encryption are performed at an IP packet level to realize the secure communication in unit of host. The IPsec is used for VPN (Virtual Private Network) and the like. The IPsec supports the authentication of the communication party by a known common key. For dynamic authentication, IPsec can utilize a mechanism, such as IKE and IKEv2, which is a higher security association mechanism.

On the other hand, SAML (Security Assertion Markup Language) has been developed as industrial standard specifications for assertion of the security statement concerning user authentication (for example, see [SAML] OASIS Security Services TC, "Security Assertion Markup Language (SAML) v1.1", Sep. 2003, http://www.oasis-open.org/committees/tc_home.php?wg_abbrev=security>). The SMAL is a framework in which the statements concerning client security and policy decision are expressed in an XML format to electronically make assurance.

Thus, the applications of the authentication means via network are currently in progress in the different layers, and, as described above, the authentication means has become the essential technical element for communication and services.

In the case where an authentication object is a person, principal confirmation technology whether the identity of a person is confirmed or not has also received attention. Usually, in the authentication, it is necessary that the authentication object is strictly identified or verified. Therefore, in the case where the authentication object is a person, the strict principal confirmation technology is required.

Currently biometrics can be cited as the potential principal confirmation technology. The biometrics is the technology in which the identity of a person is confirmed by matching biometric information read from an individual person and previously registered biometric information (hereinafter referred to as reference biometric information). The biometric information is one which indicates intrinsic physical features or characteristics in an individual. For example, a fingerprint, an iris, a retina, a face, a voice, a key stroke, a sign, and the like are utilized for the biometrics.

Unlike the existing authentication methods such as a password, the biometrics utilizes the biometric information which is in no danger of being missed or forgotten, so that the user's burden is reduced. Further, because the biometrics is based on the subject which is difficult to be duplicated, the biometrics is effective for prevention of impersonation of a user and the like.

With the widespread of the open network such as the Internet, the utilization of the biometrics is rapidly increasing as the method of performing the authentication of the communication party via network in an electronic commerce. In the identification field, it is studied that the biometrics is used for the principal confirmation of an owner of an identification card.

In the utilization of the biometrics via network, security of matching result and matching information becomes troublesome on a network path. However, on the network path or in the instrument, the risk of theft or tampering of important information such as the biometric information is being reduced by combination of the biometrics and Public Key Infrastructure or a secure medium such as an IC card. Namely, the security on the network path is being improved.

Further, a multimodal biometric system which confirms the principal in an integrated manner by combining the plural biometrics methods is studied. According to the multimodal biometric system, the principal confirmation can be realized with higher accuracy.

However, according to the study of the inventor, in almost all the current authentication technologies, there is the problem that the assurance of each process is not considered because it is assumed that the same management manages the processes constituting the authentication. Namely, unlike the assumption, different managements manage each authentication subprocess in fact.

For example, in the case of the biometrics, there are authentication subprocesses such as a biometric information capturing function and a biometric information matching function. In such authentication subprocesses, mounted devices and deployment on the instrument are often uniquely fixed depending on the system. Specifically, in the case of an MOC (Matching On Card) model which is one of the biometric models, the biometric information capturing function is deployed on a scanner, and the biometric information matching function and a biometric template management function are deployed on the card (smart card and the like). Namely, in the MOC model system, the capturing function as the authentication subprocess is uniquely managed by the scanner, and the matching function and the management function as the authentication subprocess are uniquely managed by the card.

Thus, in the authentication subprocess, the management is often different in each process. Therefore, on the verification side which verifies the authentication result, it is difficult to clearly grasp whether the authentication subprocess of each management is valid or not.

Accordingly, since the validity of the authentication subprocess cannot be grasped, as a whole of the authentication process in which the authentication subprocesses are integrated, there is a fear that trustworthiness is decreased. Particularly, since the authentication process in the open network environment is not always operated by the same management, it is thought that the fear becomes remarkable.

BRIEF SUMMARY OF THE INVENTION

An object of the invention is to provide an authentication system, apparatus, program, and method, in which the management assures each authentication subprocess, the assured contents can be verified by a verification side, and thereby the trustworthiness of the whole authentication process can be improved.

According to a first aspect of the invention, there is provided an authentication system comprising: a plurality of authentication entity devices which separately execute authentication subprocesses, the authentication subprocess constituting an authentication process; and a verification device which verifies the authentication process executed by the each authentication entity device, wherein the each authentication entity device includes: a confidential information memory module configured to store confidential information for verification by the verification device; an authenticator generating module configured to generate an authenticator on executed contents of the authentication subprocess using the confidential information; a specific context generating module configured to generate a specific context pursuant to a specific format from the authenticator and the executed contents; and a specific context output module configured to output the specific context, and the verification device comprises: a communication module which is provided with a function of conducting communication with an external device; and a context verifying module configured to verify each context, the each context being generated by the each authentication entity device and received by the communication module.

According to the first aspect of the invention, the verification device can verify the contents of each authentication subprocess performed by each authentication entity device based on the authenticator. Therefore, the management (each authentication entity device) assures each authentication subprocess, the assured contents can be verified by the verification side, and thereby the trustworthiness of the whole authentication process can be improved.

The effect of the invention is not limited to the authentication system, but the effect is also obtained in the authentication entity device, the program used in the authentication entity device, and the authentication method.

BRIEF DESCRIPTION OF THE SEVERAL VIEWS OF THE DRAWING

FIG. 3 is a block diagram showing a configuration of an entity device in the first embodiment;

FIG. 21 is a schematic view showing a relationship between specific contexts in the fourth embodiment;

FIG. 22 is a schematic view showing a structure of a generic context in the fourth embodiment;

FIG. 23 is a schematic view showing a structure of a biometric device specific context in a fifth embodiment of the invention;

FIG. 27 is a flowchart for explaining an operation of a matching-process executing unit in the sixth embodiment;

FIG. 30 is a block diagram showing a partial configuration of an authentication system according to a seventh embodiment of the invention;

DETAILED DESCRIPTION OF THE INVENTION

Figure 1:
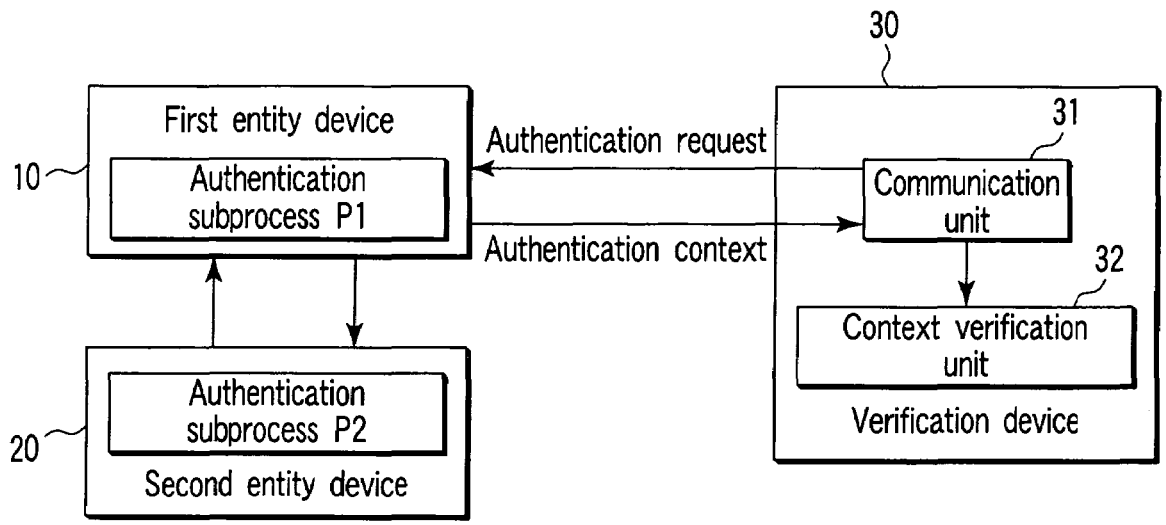
FIG. 1 is a block diagram showing a configuration of an authentication system according to a first embodiment of the invention.

Referring now to the drawings, preferred embodiments of the invention will be described below.

First Embodiment

Figure 2:
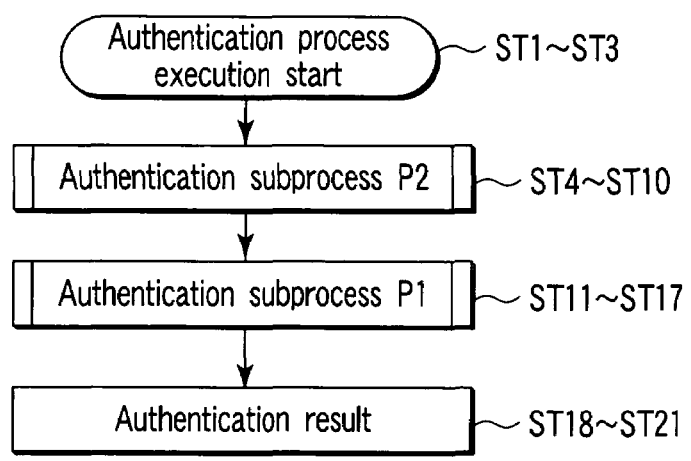
FIG. 2 is a schematic view for explaining an authentication process in the first embodiment.

FIG. 1 is a block diagram showing a configuration of an authentication system according to a first embodiment of the invention. FIG. 2 is a schematic view for explaining an authentication process in the authentication system. As shown in FIG. 2, the authentication process includes two authentication subprocesses P2 and P1. The authentication result is obtained based on the executing results of the authentication subprocesses P2 and P1. The authentication subprocesses P1 and P2 are executed by first and second entity devices 10 and 20 different from each other. In this case, the authentication subprocess P1 is executed by the first entity device 10 and the authentication subprocess P2 is executed by the second entity device 20.

As used herein, the term of authentication process means the process of verifying that the authentication object (person, device, and the like) is valid. The term of validity means that the criteria authorized by the verification side is satisfied. The term of authentication subprocess means the process constituting the authentication process. For example, in the case of the authentication process using the biometric information, the authentication subprocess includes 1) capturing the biometric information and 2) extracting characteristics. Sometimes combination of 1) and 2) is referred to as one authentication subprocess.

Thus, in the authentication process, one or more authentication subprocesses may be executed by the different entity devices separately. The post-stage authentication subprocess may be executed based on the result of the fore-stage authentication subprocess, or the post-stage authentication subprocess may be executed without referring to the fore-stage authentication subprocess.

The authentication system includes the first entity device 10, the second entity device 20, and a verification device 30. The verification device 30 includes a communication unit 31 and a context verification unit 32. The communication unit 31 conducts communication with the first entity device 10. The context verification unit 32 verifies the context generated by the first entity device 10.

FIG. 3 shows the configurations of the first entity device 10 and the second entity device 20. The entity devices 10 and 20 include communication units 11 and 21, confidential information management units 13 and 23, authenticator generating units 14 and 24, and context generating units 15 and 25, respectively. The first entity device 10 includes an authentication subprocess P1 executing unit 12. The second entity device 20 includes an authentication subprocess P2 executing unit 22. Confidential information 1 for generating the authenticator is previously stored in the confidential information management unit 13 of the first entity device 10, and confidential information 2 for generating the authenticator is previously stored in the confidential information management unit 23 of the second entity device 20.

The communication units 11 and 21 of the entity devices 10 and 20 conduct the communication with the verification device 30 and the entity devices 20 and 10 which are external devices respectively.

The authentication subprocess P1 executing unit 12 of the first entity device 10 executes the authentication subprocess P1 to output the executed result. The authentication subprocess P2 executing unit 22 of the second entity device 20 executes the authentication subprocess P2 to output the executed result.

The authenticator generating units 14 and 24 generate the authenticator on the inputted data using the confidential information read from the confidential information management units 13 and 23. For example, the authenticator is a digital signature or a message authentication code (MAC). For example, in the case where the authenticator is the digital signature, the confidential information means a pair of a private key and a public key in a public key cryptography. In the case where the authenticator is message authentication code, the confidential information means a common key which is previously shared with the verification device 30. In the case where the confidential information is the pair of the private key and the public key, it is assumed that the public key certificate is stored in the confidential information management units 13 and 23. The public key certificate corresponding to the private key is previously issued from a certificate authority (CA) based on the public key infrastructure.

The context generating units 15 and 25 form the executed results of the authentication subprocess P1 executing unit 12 or the authentication subprocess P2 executing unit 22 and the authenticator outputted from the authenticator generating units 14 and 24 according to a specific format. The context generating units 15 and 25 output the formed results. In the specification, the information formed according to the specific format by the context generating units 15 and 25 is referred to as specific context.

Each of the units 11 to 15, 21 to 25, 31 and 32 in the devices 10, 20, and 30 may be realized using either a hardware module or a software module. The same holds true for each unit added in the following embodiments.

Then, referring to a flowchart of FIG. 4, an operation of the authentication system having the above configuration will be described.

(Overall Operation)

Figure 4:
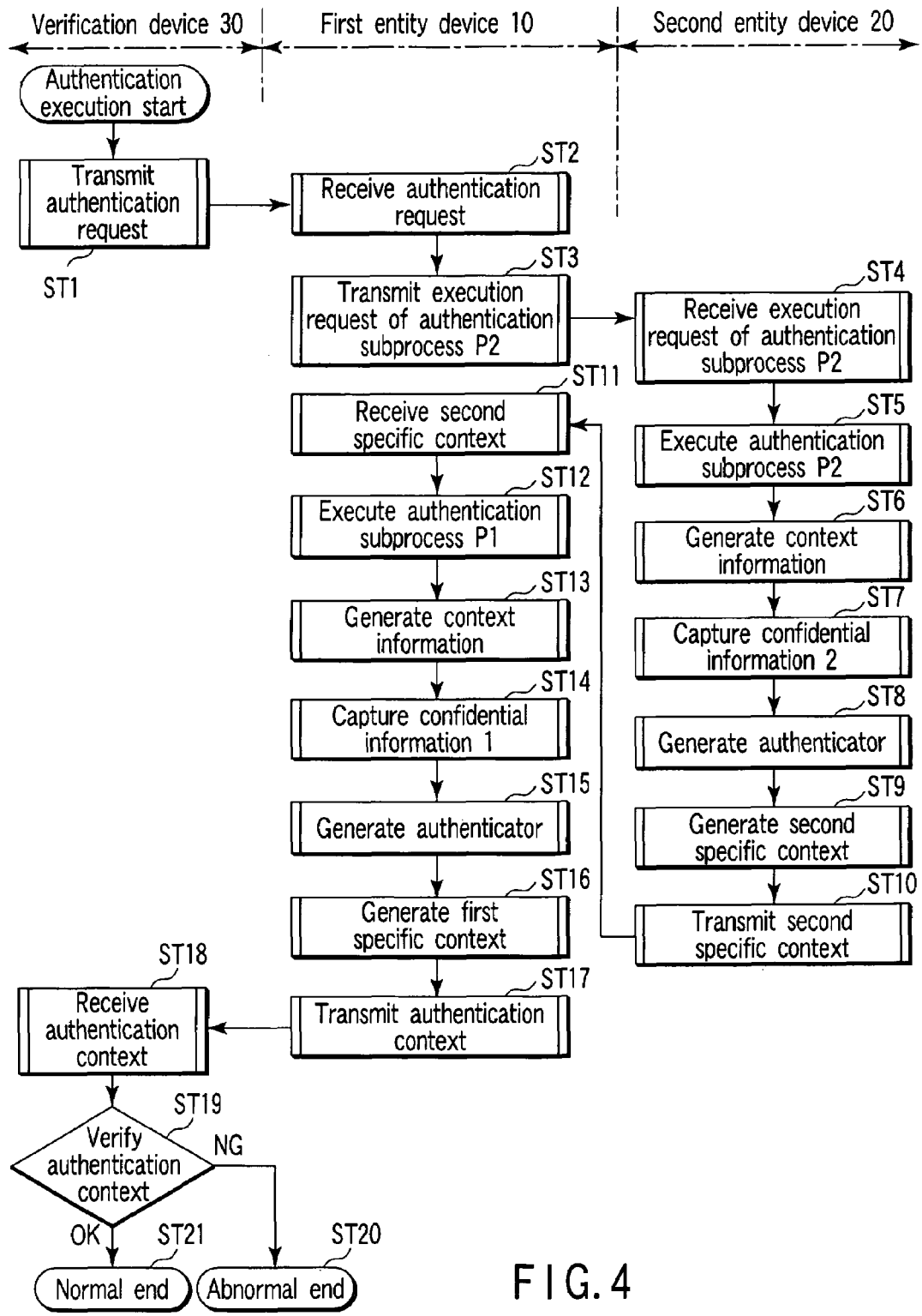
FIG. 4 is a flowchart for explaining an operation in the first embodiment.

As shown in FIG. 4, when an authentication request is transmitted from the verification device 30 to the first entity device 10 (ST1), the execution of the authentication process is started. The authentication request may include the information that specifies the authentication process and the requirement necessary to securely execute the authentication process. The information includes challenge value formed by random numbers.

When the first entity device 10 receives the authentication request (ST2), the first entity device 10 is pursuant to the predetermined authentication process or the authentication process specified by the authentication request. Namely, the first entity device 10 transmits an execution request of the authentication subprocess P2 to the second entity device 20 pursuant to the authentication process (ST3). The execution request may include the information that specifies the authentication process and the requirement necessary to securely execute the authentication process, included in the authentication request from the verification device 30. The execution request may also include the information, which is necessary for the execution of the authentication subprocess P2 and held only by the first entity device 10.

When the second entity device 20 receives the execution request of the authentication subprocess P2 (ST4), the second entity device 20 is pursuant to the predetermined authentication process or the authentication process specified by the authentication request from the verification device 30.

Namely, by executing the authentication subprocess P2 pursuant to the authentication process in the authentication subprocess P2 executing unit 22 (ST5), the second entity device 20 obtains the executed results.

Then, the executed result of the authentication subprocess P2 is inputted to the context generating unit 25, and the context generating unit 25 generates a second specific context p2 formed in the following structure. At this point, the information included in the execution request may be inputted to the context generating unit 25.

Figure 5:
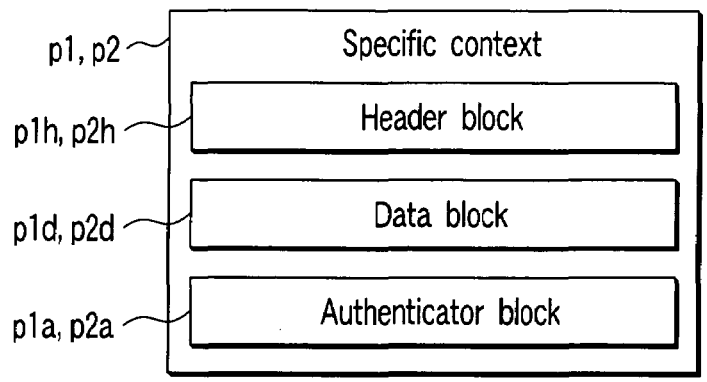
FIG. 5 is a schematic view showing a structure of a specific context in the first embodiment.

FIG. 5 shows the structure of the second specific context p2. The second specific context p2 is formed pursuant to the specific format. The second specific context p2 includes a header block p2h, a data block (execution contents) p2d, and an authenticator block p2a.

The header block p2h includes the information for identifying the second specific context p2. Further, the header block p2h may include the information on the structure of the second specific context p2.

The data block p2d includes the executed result of the authentication subprocess P2. Further, the data block p2d may include the information included in the execution request or the information which can identify these pieces of information. As used herein, the data block (execution contents) means the information used to decide whether the object (person, device, and the like) to which the verification side performs the authentication is valid or not, i.e. whether the object satisfies the criteria or not. The data block means the information generated in each authentication subprocess, for example the biometric information (for example, fingerprint information) generated by capturing subprocess.

The authenticator block p2a is the information including the authenticator generated in the following procedure.

The context generating unit 25 forms the executed result of the authentication subprocess P2 pursuant to the specific format, which allows the context generating unit 25 to generate the header block p2h and the data block p2d of the second specific context p2 (ST6). The authenticator generating unit 24 reads the confidential information 2 for generating the authenticator from the confidential information management unit 23 (ST7). The authenticator generating unit 24 generates the authenticator on the header block p2h and the data block p2d using the confidential information 2 (ST8). Finally, the context generating unit 25 forms the generated authenticator pursuant to the specific format. Therefore, the context generating unit 25 generates the authenticator block p2a including the authenticator. Then, the context generating unit 25 concatenates the authenticator block p2a to the header block p2h and the data block p2d of Step ST6 to generate the second specific context p2 (ST9).

The second entity device 20 transmits the second specific context p2 generated in the above operation to the first entity device 10 (ST10).

Then, the first entity device 10 receives the second specific context (ST11). In the case where the entity devices 10 and 20 include specific context verifying units 19 and 29, the first entity device 10 can cause the specific context verifying unit 19 to verify the format and authenticator of the second specific context p2, and thereby the first entity device 10 can verify whether the authentication subprocess P2 is executed in the valid manner or not. The specific context verifying unit 19 can refer to the confidential information in the confidential information management unit 13 during the verification. Further, if necessary, the specific context verifying unit 19 may decide whether the information included in the data block p2d in the specific context p2 satisfies the predetermined criteria or not.

In either case, the first entity device 10 executes the authentication subprocess P1 using the authentication subprocess P1 executing unit 12 (ST12), and the executed result is obtained. At this point the contents included in the second specific context p2 may be referred to or not referred to. It depends on the previously determined process or the process specified by the authentication request from the verification device 30.

Then, the executed result of the authentication subprocess P1 is inputted to the context generating unit 15, and the context generating unit 15 generates a first specific context p1 formed in the following structure. At this point, the information included in the authentication request and the information included in the second specific context P2 may be inputted.

The first specific context p1 has the same structure as for the second specific context p2. The first specific context p1 is formed pursuant to the specific format. The first specific context p1 includes a header block p1h, a data block p1d, and an authenticator block p1a.

The header block p1h includes the information for identifying the first specific context p1. Further, the header block p1h may include the information on the structure of the first specific context p1.

The data block p1d includes the executed result of the authentication subprocess P1. Further, the data block p1d may include the information included in the authentication request, the information which can identify these pieces of information, or the contents included in the second specific context p2.

The authenticator block p1a is the information including the authenticator generated in the following procedure.

The context generating unit 15 forms the executed result of the authentication subprocess P1 pursuant to the specific format, which allows the context generating unit 15 to generate the header block p1h and the data block p1d of the first specific context p1 (ST13). The authenticator generating unit 14 reads the confidential information 1 for generating the authenticator from the confidential information management unit 13 (ST14). The authenticator generating unit 14 generates the authenticator on the header block p1h and the data block p1d using the confidential information 1 (ST15). Finally, the context generating unit 15 forms the generated authenticator pursuant to the specific format. Therefore, the context generating unit 15 generates the authenticator block p1a including the authenticator. Then, the context generating unit 15 concatenates the authenticator block p1a to the header block p1h and the data block p1d of Step ST13 to generate the first specific context p1 (ST16).

The first entity device 10 transmits the first and second specific contexts p1 and p2, generated in the above operation, as the authentication context to the verification device 30 (ST17).

The verification device 30 verifies the format and authenticator of the received first and second specific contexts p1 and p2 using the context verification unit 32 (ST18 and ST19). In the case where the authenticator is the digital signature, the context verification unit 32 verifies the authenticator using the corresponding public key. In the case where the authenticator is message authentication code, the context verification unit 32 verifies the authenticator using the common key previously shared with the entity devices 10 and 20.

When the verification device 30 fails the verification of the authenticator (ST19; NG), the verification device 30 decides that the authenticator is invalid and the process is ended (ST20).

On the other hand, the verification device 30 succeeds in verifying the authenticator (ST19; OK), the verification device 30 can verify that the authentication subprocesses P2 and P1 are executed by the valid entity devices 20 and 10 respectively, and the verification device 30 can also verify that the authentication result assured by the pieces of confidential information of the entity devices 20 and 10 is obtained. Accordingly, when the verification device 30 succeeds in verifying the authenticator, the process is normally ended (ST21). Further, if necessary, the verification device 30 may decides whether the pieces of information included in the data blocks p1d and p2d in the specific contexts P1 and P2 satisfy the criteria of the successful verification or not without ending the process. When the information does not satisfy the criteria (ST19; NG), the verification device 30 decides that the verification is failed, and the process is ended (ST20). When the information satisfies the criteria (ST19; OK), the verification device 30 decides that the verification is successful, and the process is normally ended (ST21).

As described above, according to the first embodiment, the verification device 30 can verify the contents of the authentication subprocess executed by each of the entity devices 10 and 20 based on the authenticator. Therefore, the management (each authentication entity device) assures each authentication subprocess and the verification side can verify the assured contents, which allows the trustworthiness to be improved in the whole authentication process.

In more detail, the management to which the authentication subprocess belongs assures the statement concerning the process constituting the authentication, and the management integrates the statements in a format independent of the client authentication environment to notify the verification side. Therefore, an arbitrary verification side can verify the authentication result, and the trustworthiness is improved in the whole authentication process.

Further, the verification device 30 can verify the validity of the authentication process and executed results of authentication subprocesses in each entity device for any combination of entity devices and authentication subprocesses. For example, it can verify for the case in which the authentication subprocess is divided into two or more processes, the case in which the all authentication subprocesses are executed by the different entity devices, the case in which the post-stage authentication subprocess is executed by referring to the result of the fore-stage authentication subprocess (e.g. the subprocess P1 is executed by referring to the result of the subprocess P2), and the case in which the post-stage authentication subprocess is executed not by referring to the result of the fore-stage authentication subprocess (e.g. the subprocess P1 is executed not by referring to the result of the subprocess P2).

The first embodiment may be modified such that the private key in the public key cryptography is stored as the confidential information in each of the confidential information management units 13 and 23 and the authenticator generating unit 14 generates the authenticator as the digital signature in the public key cryptography using the private key. In this modification, that the validity of each of the entity devices 10 and 20 is assured based on the public key infrastructure which is the external authentication infrastructure can be verified by verifying the public key certificate of each of the entity devices 10 and 20.

Second Embodiment

Figure 6:
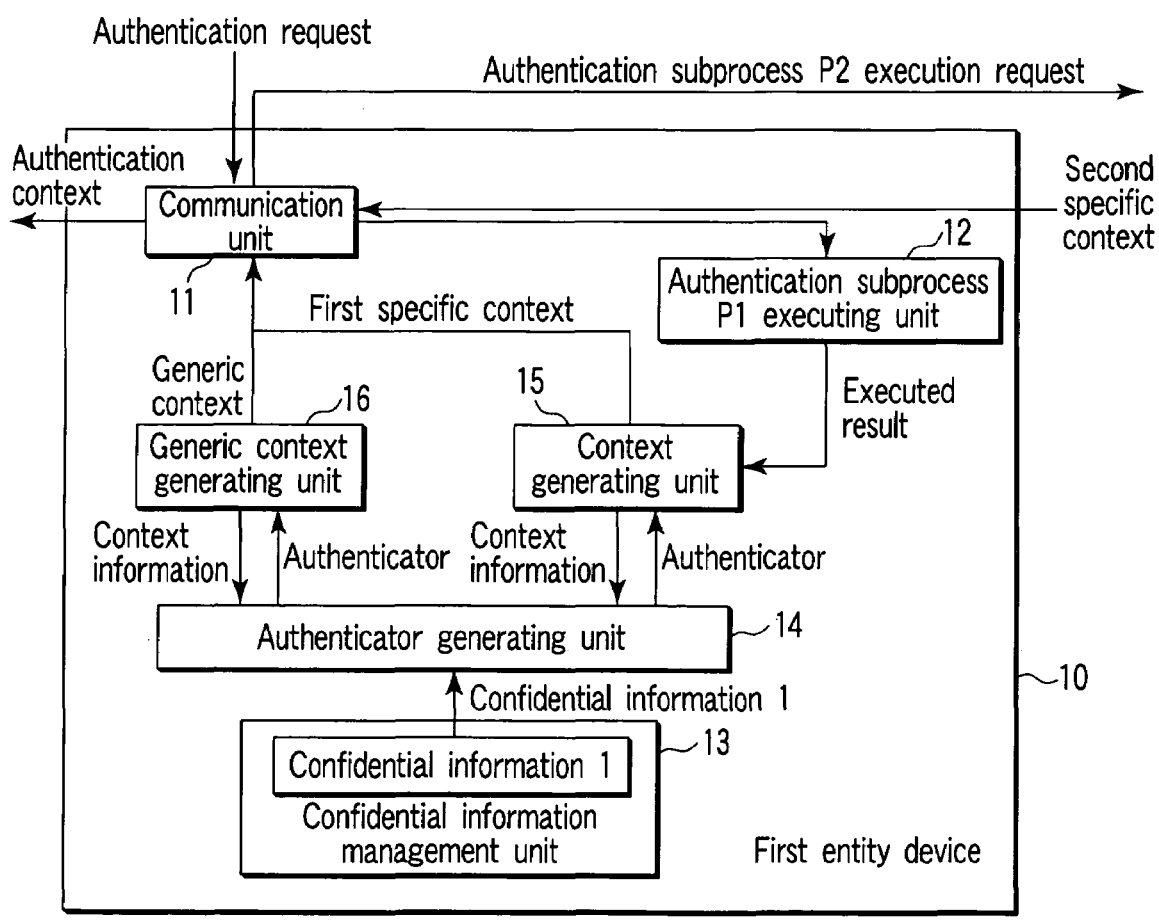
FIG. 6 is a block diagram showing a configuration of a first entity device according to a second embodiment of the invention.
Figure 7:
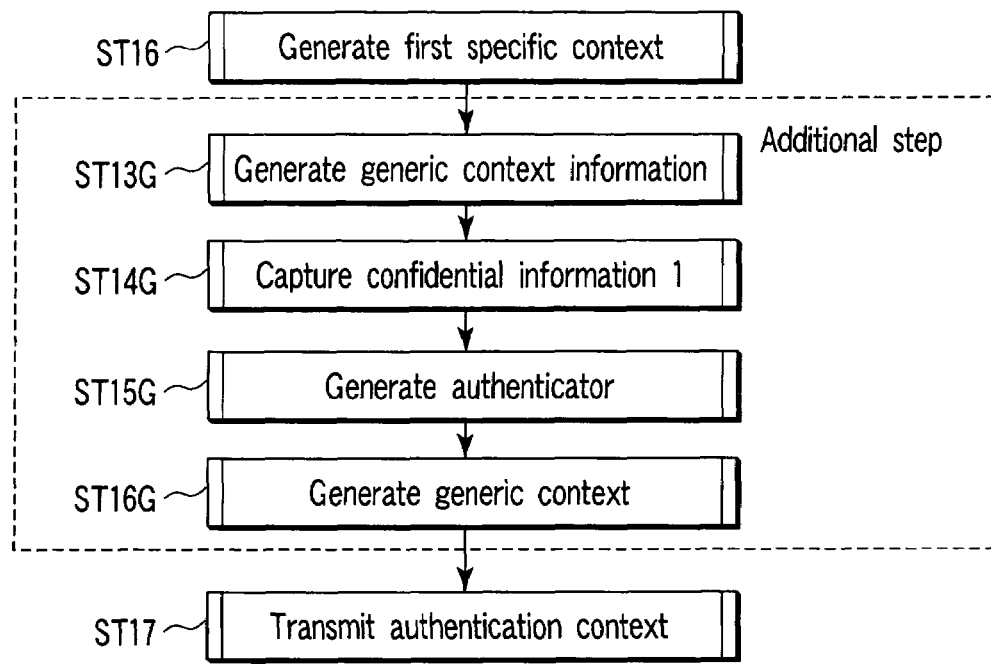
FIG. 7 is a flowchart for explaining an operation of an additional portion in the second embodiment.

A second embodiment of the invention is an example of the authentication system in which a generic context generating unit 16 is added to a first entity device 10. FIG. 6 shows a configuration of the first entity device 10. FIG. 7 shows a flowchart for explaining the operation of a portion to which the generic context generating unit 16 is added.

The generic context generating unit 16 forms the information which can identify a first specific context p1 and a second specific context p2 and the authenticator outputted from an authenticator generating units 14 pursuant to the specific format, and the generic context generating unit 16 outputs the results.

Figure 8:
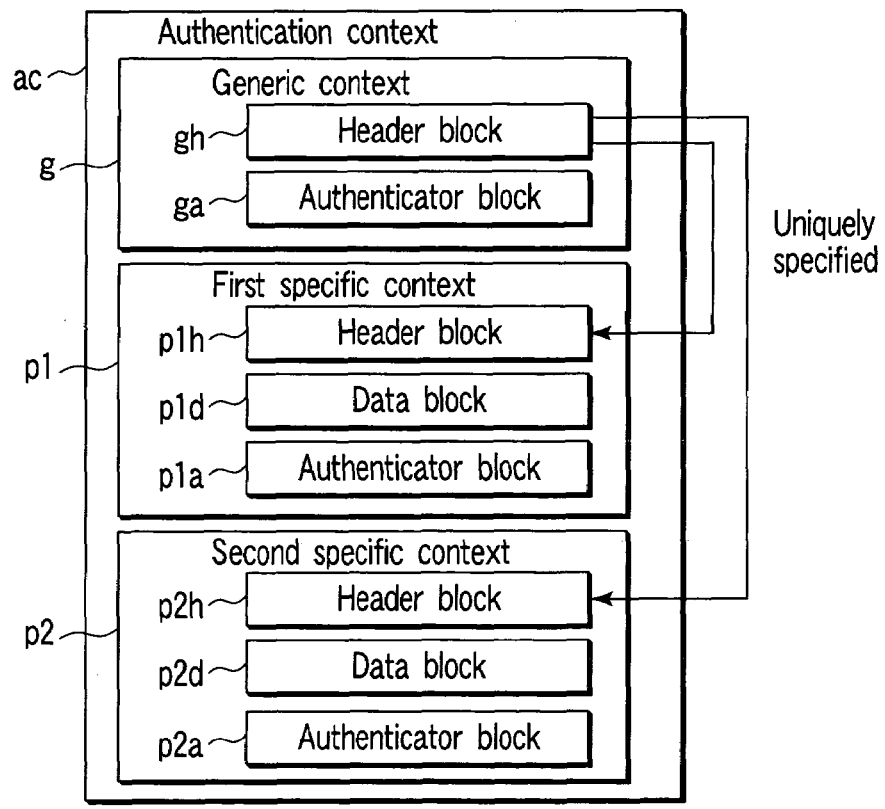
FIG. 8 is a schematic view showing a structure of a generic context in the second embodiment.

FIG. 8 shows the structure of the generic context. A generic context g includes a header block gh and an authenticator block ga. The header block gh includes the information which can identify the first and second specific contexts p1 and p2. The header block gh may further include the information on the structure of the generic context g and the information included in the authentication request. The authenticator block ga is the information including the authenticator generated in the following manner.

The operation flow in the first entity device 10 is similar to the first embodiment until the first specific context p1 is generated. Then, the generic context generating unit 16 generates the header block gh of the generic context g. The authenticator generating unit 14 reads confidential information 1 from a confidential information management unit 13. The authenticator generating unit 14 generates the authenticator on the header block gh of the generic context g, the first specific context p1, and the whole of second specific context p2 using the confidential information 1. Finally, the generic context generating unit 16 forms the generated authenticator pursuant to the specific format. Therefore, the generic context generating unit 16 generates the authenticator block ga including the authenticator. Then, the generic context generating unit 16 concatenates the authenticator block ga to the header block gh to generate the generic context g. Then, the generic context generating unit 16 outputs the generic context g.

The first entity device 10 transmits the generic context g and the first and second specific contexts p1 and p2, obtained by the above operation, as authentication contexts ac to a verification device 30.

The verification device 30 verifies the format and authenticator of the received generic context g using a context verification unit 32. Through the verification, it can be easy to verify the authentication context ac generated according to the valid authentication process. It can also be verified that the verified result is assured by the confidential information of the entity which is a management supervisor of the whole authentication process. Further, it can be easy to identify the management supervisor.

If necessary, the context verification unit 32 may perform the verification to the format and authenticator of the first and second specific contexts p1 and p2. Through the verification, it can be verified that the authentication subprocess P2 and P1 are executed by the valid entity devices 20 and 10 respectively. It can be verified that the authentication result is assured by the confidential information in the entity device. Further, the executed result of the authentication subprocess can be known in detail.

If necessary, the verification device 30 may decides whether the pieces of information included in the data block p1d and p2d in the specific contexts p1 and p2 satisfy the criteria of the successful authentication.

As described above, according to the second embodiment, in addition to the effect of the first embodiment, it can be verified that the authentication context is assured by the confidential information of the entity which is the management supervisor of the whole authentication process, and it can be easy to identify the management supervisor.

In the second embodiment, the generic context generating unit 16 is added to the inside of the first entity device 10 of the first embodiment. However, the invention is not limited to the second embodiment. For example, even if the entity device except for the first entity device 10 or the entity device which does not generate the specific context generates the generic context g, the same effect can be obtained.

Third Embodiment

Figure 9:
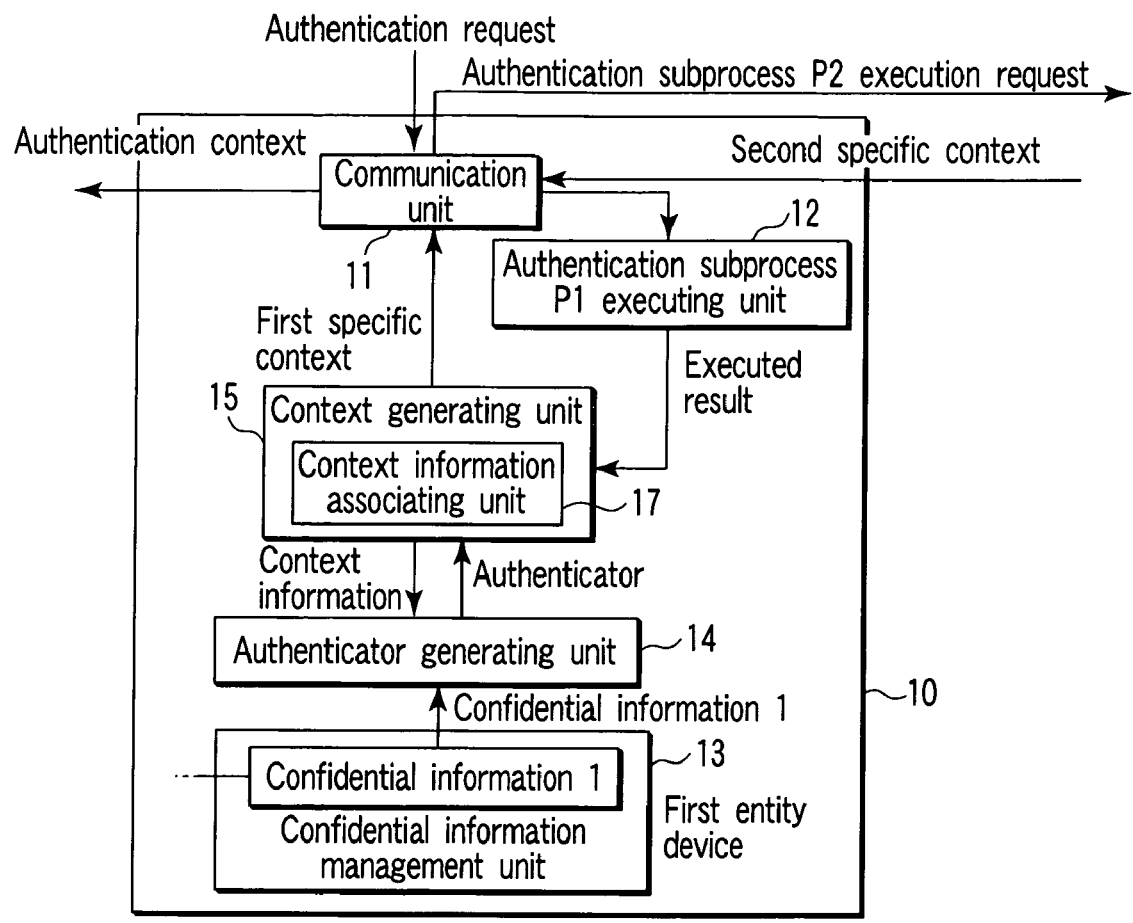
FIG. 9 is a block diagram showing a configuration of a first entity device according to a third embodiment of the invention.

A third embodiment of the invention is an authentication system in which a context generating unit 15 of a first entity device 10 in the first and second embodiments includes a context information associating unit 17. FIG. 9 shows a configuration of the first entity device 10.

The context information associating unit 17 relates the execution of the authentication subprocess P1 with the reception of the second specific context p2. Therefore, the context generating unit 15 outputs the first specific context p1 associated with the second specific context p2. In the case where a hierarchical structure exists between the contexts, the context which is antecedently generated is referred to as lower context and the context which is subsequently generated is referred to as higher context. Because the generic context shown in FIG. 7 is generated after all the specific contexts are generated, the generic context is the highest context.

Figure 10:
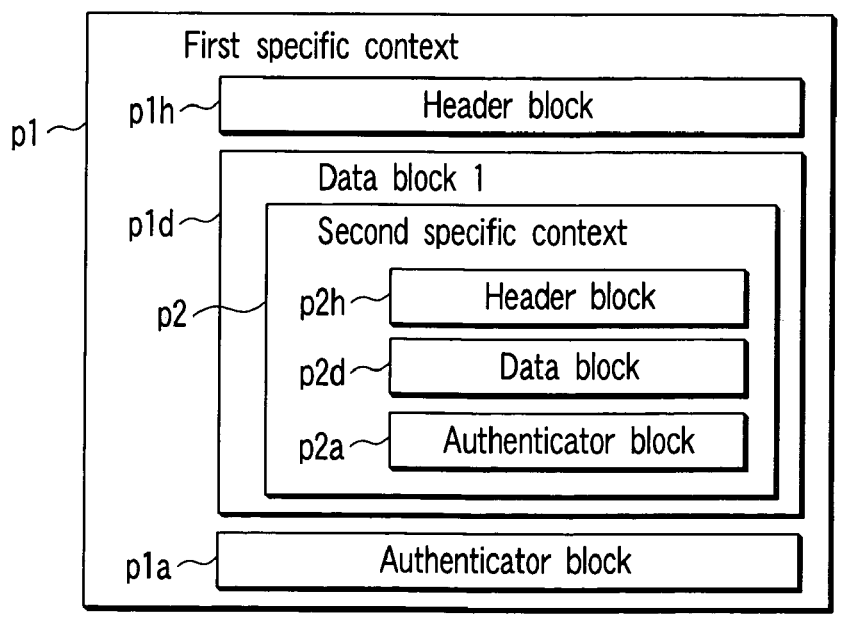
FIG. 10 is a schematic view showing a relationship between specific contexts in the third embodiment.

FIG. 10 shows an example of the first specific context p1 generated in association with the second specific context p2 by the context information associating unit 17. In this case, the association is achieved by including the second specific context p2 in the data block of the first specific context p1. Therefore, the verification device 30 can easily detect dependence between the authentication subprocesses from the authentication context ac.

Figure 11:
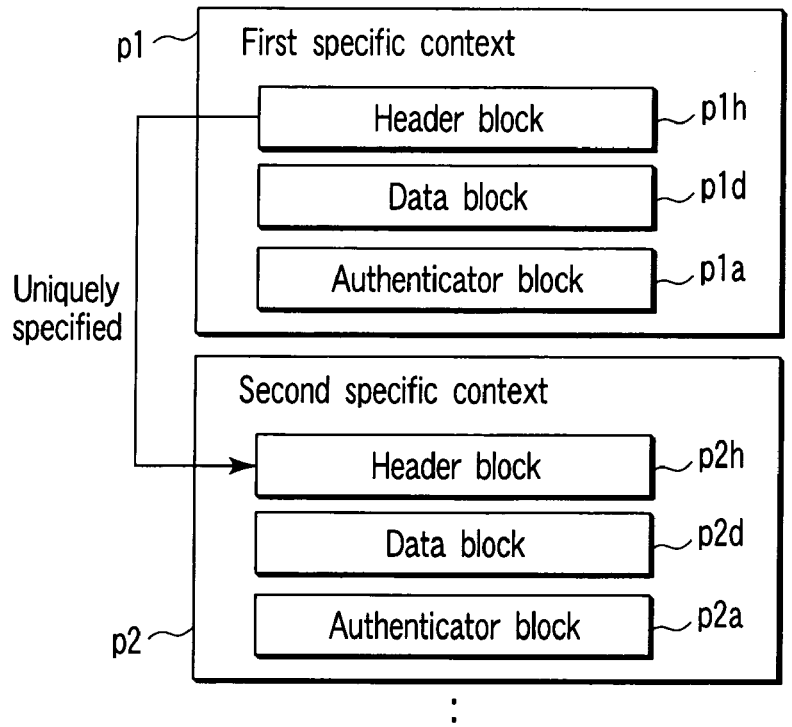
FIG. 11 is a schematic view showing the relationship between the specific contexts in the third embodiment.

FIG. 11 shows an another example of the first specific context p1 generated in association with the second specific context p2 by the context information associating unit 17. In this case, the association is achieved by having a reference in the header block of the first specific context p1. The reference is the information which can uniquely identify the second specific context p2. In the example described in FIG. 10, since the first and second specific contexts p1 and p2 are deployed in a nesting form, it is necessary to recursively perform the verification. Therefore, many resources (for example memory capacity or circuit scale) are required for the verification device 30. However, in the example of FIG. 11, since the first and second specific contexts p1 and p2 are deployed in parallel, the verification can be performed in serial. Therefore, the example of FIG. 11 is effective in the case where the small amount of resource exists in the verification device 30.

As described above, according to the third embodiment, in addition to the effects of the first and second embodiments, the dependence between the authentication subprocesses associated with the individual specific context can be clearly expressed in the case of the nesting structure shown in FIG. 10.

In the case of the serial structure shown in FIG. 11, while the dependence between the specific contexts can be clearly expressed, the specific contexts can be associated in parallel. Therefore, the amount of information on individual specific context can be decreased, and the burdens of the context generating process and analyzing process can be reduced.

Fourth Embodiment

A fourth embodiment of the invention is a modification of the first to third embodiments. Particularly, in the fourth embodiment, an authentication system is specifically shown using the authentication with the biometric information.

Figure 12:
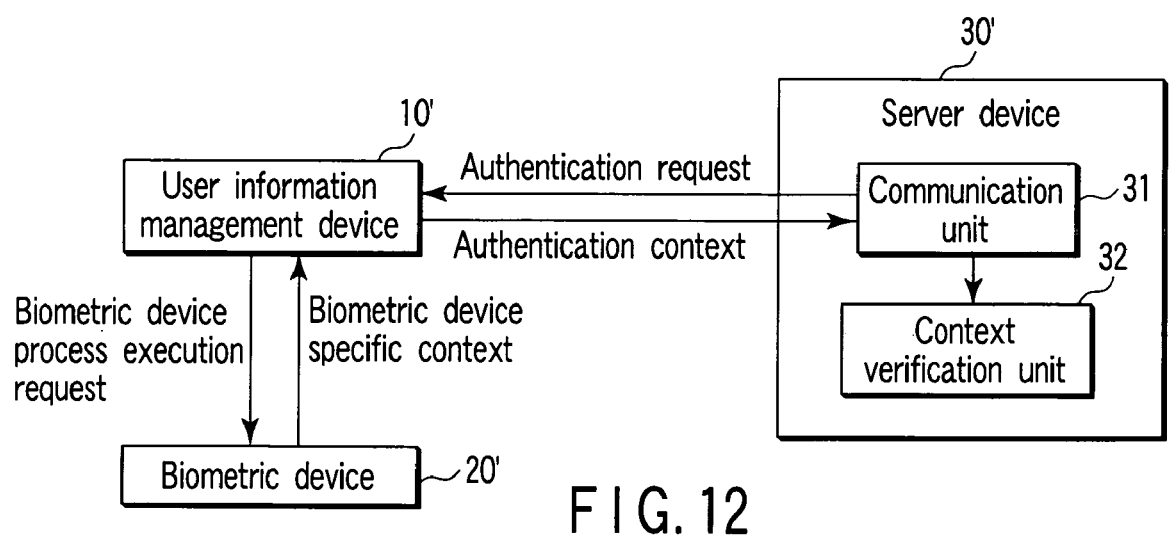
FIG. 12 is a block diagram showing a configuration of an authentication system according to a fourth embodiment of the invention.

FIG. 12 shows an example in which the first embodiment is applied to an authentication system (hereinafter referred to as MOC model (Match On Card model) including a server device 30', a user information management device 10', and a biometric device 20'.

The server device 30' includes the function of performing the user authentication in order to provide a certain service. The user information management device 10' includes the function of managing user biometric information (hereinafter referred to as biometric template) referred to in the authentication and the function of matching the biometric template and the biometric information (hereinafter referred to as biometric sample information) captured from the user in the authentication. The biometric device 20' includes the function of extracting the biometric sample information from the user who is of the authentication object.

Figure 13:
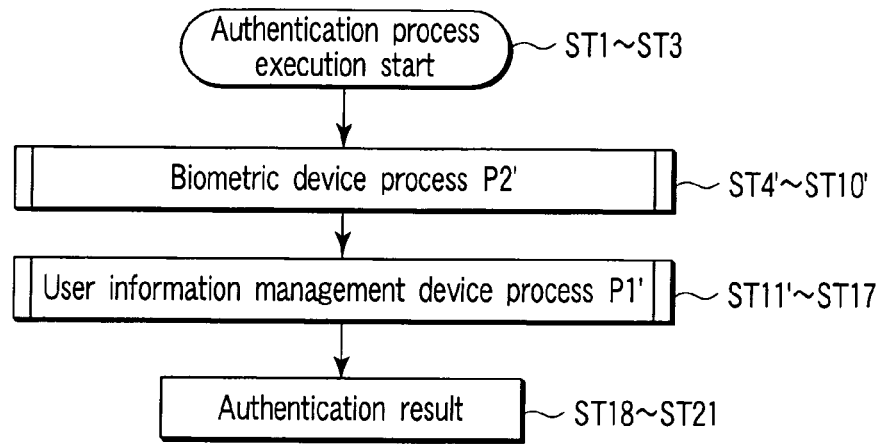
FIG. 13 is a schematic view for explaining an authentication process in the fourth embodiment.

As shown in FIG. 13, in the fourth embodiment, the authentication process to the authentication request from the server device 30' includes a process P1' by the user information management device 10' and a process P2' by the biometric device 20'. The process P1' is executed based on the executed result of the process P2'. The user information management device 10' returns the executed results of the processes P1' and P2' as the authentication context to the server device 30'.

The server device 30' includes the communication unit 31 and the context verification unit 32. The communication unit 31 conducts the communication with the user information management device 10'. The context verification unit 32 analyses the context generated by the user information management device 10'.

Figure 14:
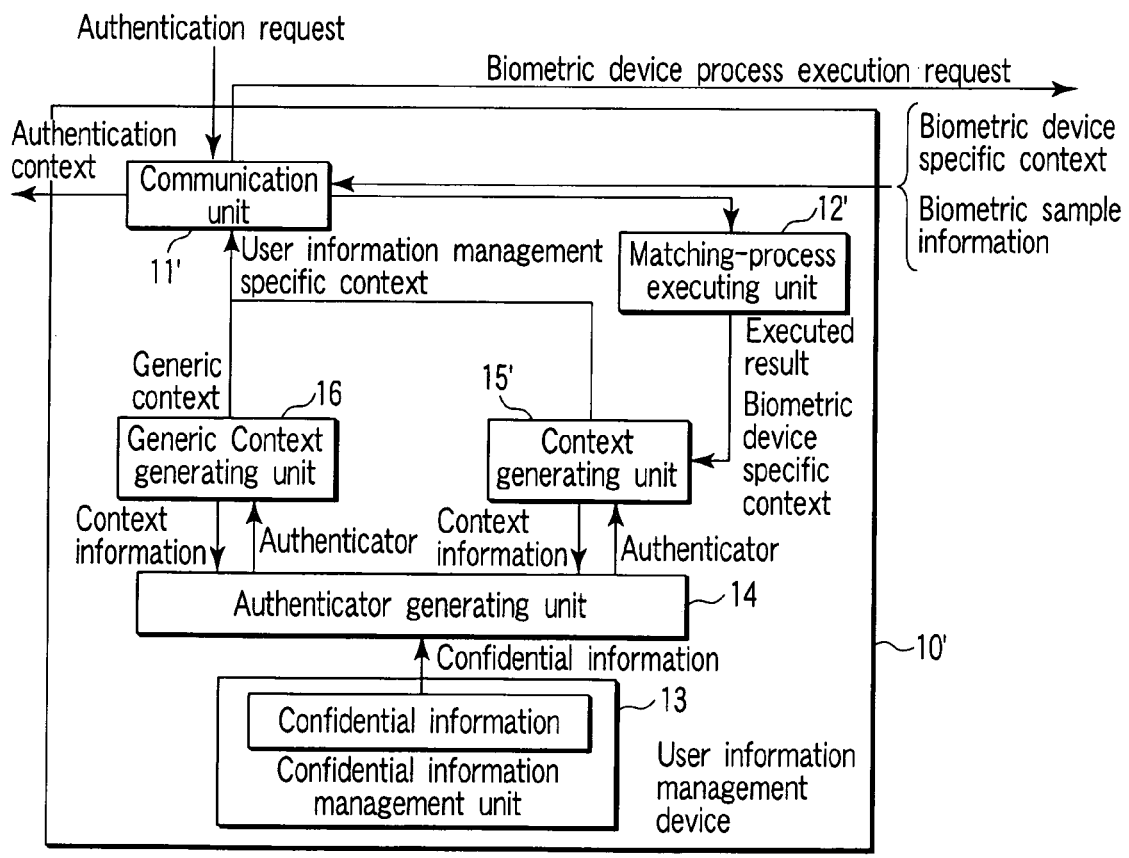
FIG. 14 is a block diagram showing a configuration of a user information management device in the fourth embodiment.

FIG. 14 shows the configuration of the user information management device 10'. The user information management device 10' in the fourth embodiment is the device in which the authentication subprocess P1 executing unit 12 of the first entity device 10 in the second embodiment is replaced with a matching-process executing unit 12'. Therefore, the user information management device 10' includes a communication unit 11' with which the communication unit 11 is replaced and a context generating unit 15' with which the context generating unit 15 is replaced. The input and output of the communication unit 11' and context generating unit 15' are set to the matching-process executing unit 12'. The devices such as the IC card and the smart card may be used as the user information management device 10'.

Figure 15:
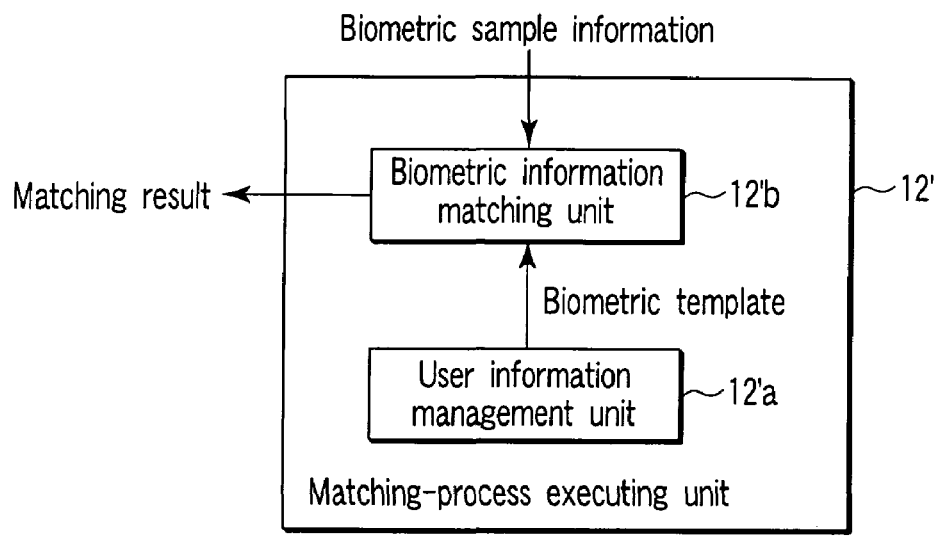
FIG. 15 is a block diagram showing a configuration of a matching-process executing unit in the fourth embodiment.

FIG. 15 shows the matching-process executing unit 12'. The matching-process executing unit 12' includes a user information management unit 12'*a* and a biometric information matching unit 12'*b*.

The biometric template of a person who is an owner of the user information management device 10' is stored in the user information management unit 12'*a*. It is desirable that the user information management unit 12'*a* has tamper-resistant characteristics. The confidential information stored in the confidential information management unit 13 of the user information management device 10' may be stored in the user information management unit 12'*a*.

The biometric information matching unit 12'*b* performs the matching process to the biometric sample information received from the biometric device 20' and the biometric template stored in the user information management unit 12'*a*, and then the biometric information matching unit 12'*b* outputs the matching result to the context generating unit 15'.

Figure 16:
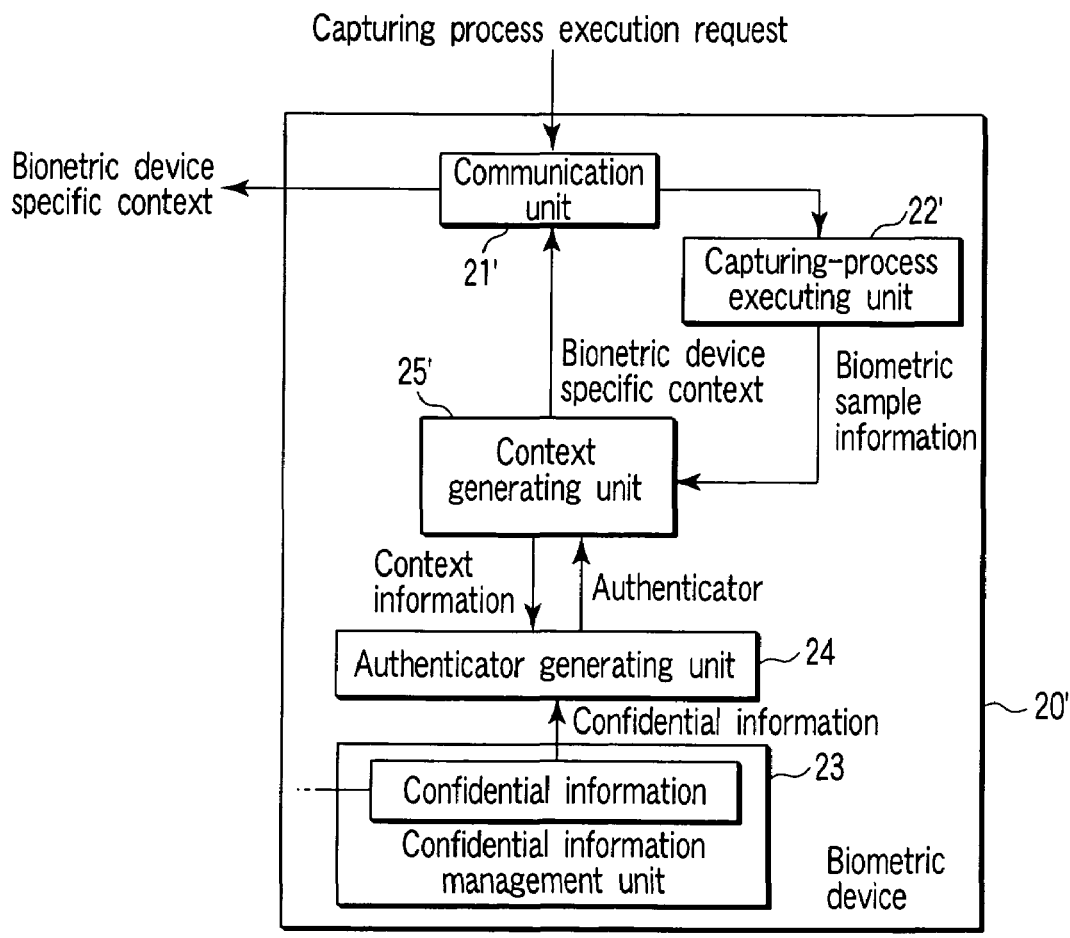
FIG. 16 is a block diagram showing a configuration of a biometric device in the fourth embodiment.

FIG. 16 shows the configuration of the biometric device 20'. The biometric device 20' in the fourth embodiment is the device in which the authentication subprocess P2 executing unit 22 of the second entity device 20 is replaced with a capturing-process executing unit 22'. Therefore, the biometric device 20' includes a communication unit 21' with which the communication unit 21 is replaced and a context generating unit 25' with which the context generating unit 25 is replaced. The input and output of the communication unit 21' and context generating unit 25' are set to the capturing-process executing unit 22'.

The capturing-process executing unit 22' performs a process of capturing the biometric information from a person who is the authentication object.

(Overall Operation)

Figure 17:
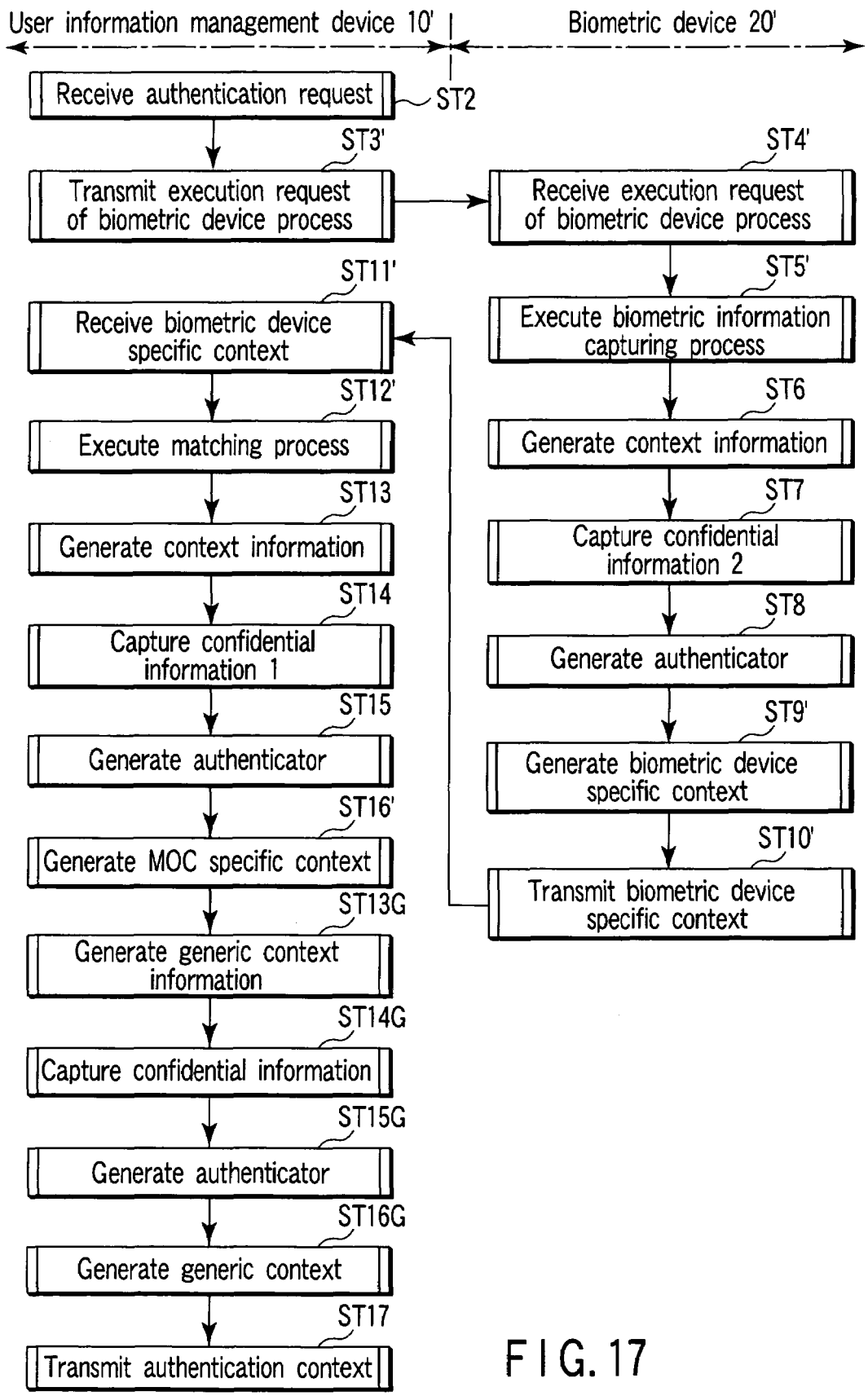
FIG. 17 is a flowchart for explaining an operation in the fourth embodiment.

The flowchart for explaining the operation of the server device 30' is similar to the flowchart for explaining the operation of the verification device 30. Then, FIG. 17 shows the flowchart for explaining the operation of the user information management device 10'.

The user information management device 10' receives the authentication request from the server device 30' (ST2). It is desirable that the authentication request includes the challenge value which is of the random numbers generated in the server device 30' or the information on a requester for identifying the server device 30'.

Then, the user information management device 10' transmits the execution request of a biometrics device process to the biometric device 20' (ST3'). It is desirable that the execution request includes the challenge value which is of the random numbers generated in the server device 30' or the information on the requestor for identifying the user information management device 10'.

When the biometric device 20' receives the execution request (ST4'), the biometric device 20' performs the process of capturing the biometric information of a person who requests the authentication (ST5') and the biometric device 20' obtains the biometric sample information. At this point, it is desirable that the captured biometric information is transformed into the format suitable to the matching.

Figure 18:
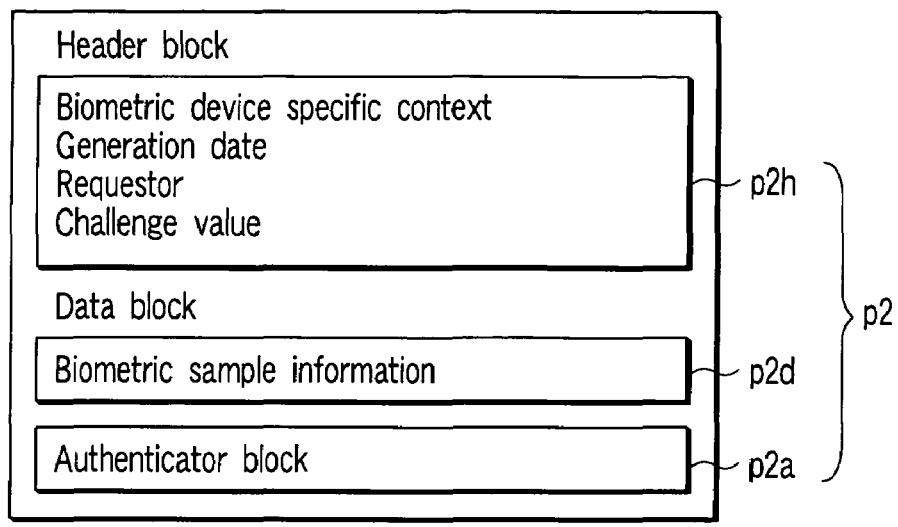
FIG. 18 is a schematic view showing a structure of a biometric device specific context in the fourth embodiment.

Then, based on the obtained biometric sample information, the context generating unit 25' generates a biometric device specific context p2 having the structure shown in FIG. 18. The specific context shown in FIG. 18 is pursuant to the definition of a profile in the fourth embodiment. In the case where another profile is defined, the specific context structure shown in FIG. 18 may be changed.

The biometric device specific context p2 includes a header block p2h, a data block p2d, and an authenticator block p2a. The header block p2h has a biometric device identifier, a generation date, the challenge value, and the requestor. The biometric device identifier is the information for uniquely identifying the biometric device specific context p2. The generation date is the information indicating the date when the biometric device specific context p2 is generated. The challenge value is the random numbers included in the biometric device process execution request. The data block p2d may have the biometric sample information obtained in the biometric information capturing process or a hash value which is of a unidirectional function. The authenticator block p2a has the authenticator for assuring data integrity of the biometric device specific context p2. In the modification of the first embodiment, the authenticator using private key based on the public key infrastructure is shown as a public example of the authenticator.

The context generating unit 25' generates the header block p2h and the data block p2d of the biometric device specific context p2 (ST6). The authenticator generating unit 24 reads the confidential information for generating the authenticator from the confidential information management unit 23 (ST7).

Then, the authenticator generating unit 24 generates the authenticator on the header block p2h and the data block p2d using the confidential information (ST8). Finally, the context generating unit 25' forms the authenticator pursuant to the specific format. Therefore, the context generating unit 25' generates the authenticator block p2a including the authenticator. Then, the context generating unit 25' concatenates the authenticator block p2a to the header block p2h and data block p2d of Step ST6 to generate the biometric device specific context p2 (ST9').

The biometric device 20' transmits the biometric device specific context p2 and the biometric sample information, which are generated in the above manner, to the user information management device 10' (ST10').

Figure 19:
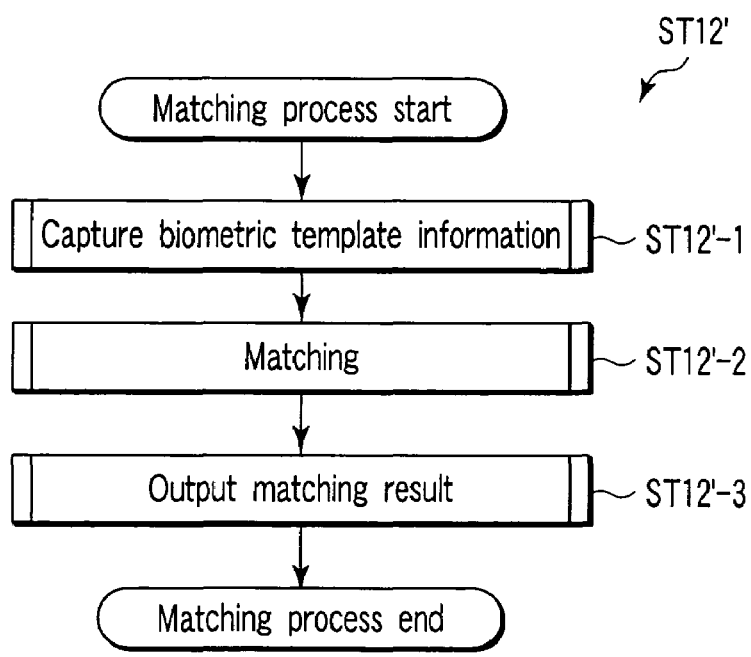
FIG. 19 is a flowchart for explaining a matching process in the fourth embodiment.

When the user information management device 10' receives the biometric device specific context p2 (ST11'), the user information management device 10' executes the matching process shown in FIG. 19 (ST12'). In the case where the verification of the biometric device specific context p2 received from the biometric device 20' is required in executing the matching process, a function unit which performs the analysis and verification of the specific context may be deployed.

In the matching process, the biometric template is read from the user information management unit 12'a (ST12'-1). Then, the process of matching the biometric template and the captured biometric sample information received from the biometric device 20' is performed (ST12'-2), and the matching result is obtained. Then, the matching result is outputted (ST12'-3).

The matching result may indicate OK (matched) and NG (unmatched), and the matching result may indicate a material for the authentication decision. For example, similarity between the biometric template and the biometric sample information can be used as the determination material. It is desirable that the biometric sample information and the biometric template are transformed into the format suitable to the matching before performing the matching process.

Figure 20:
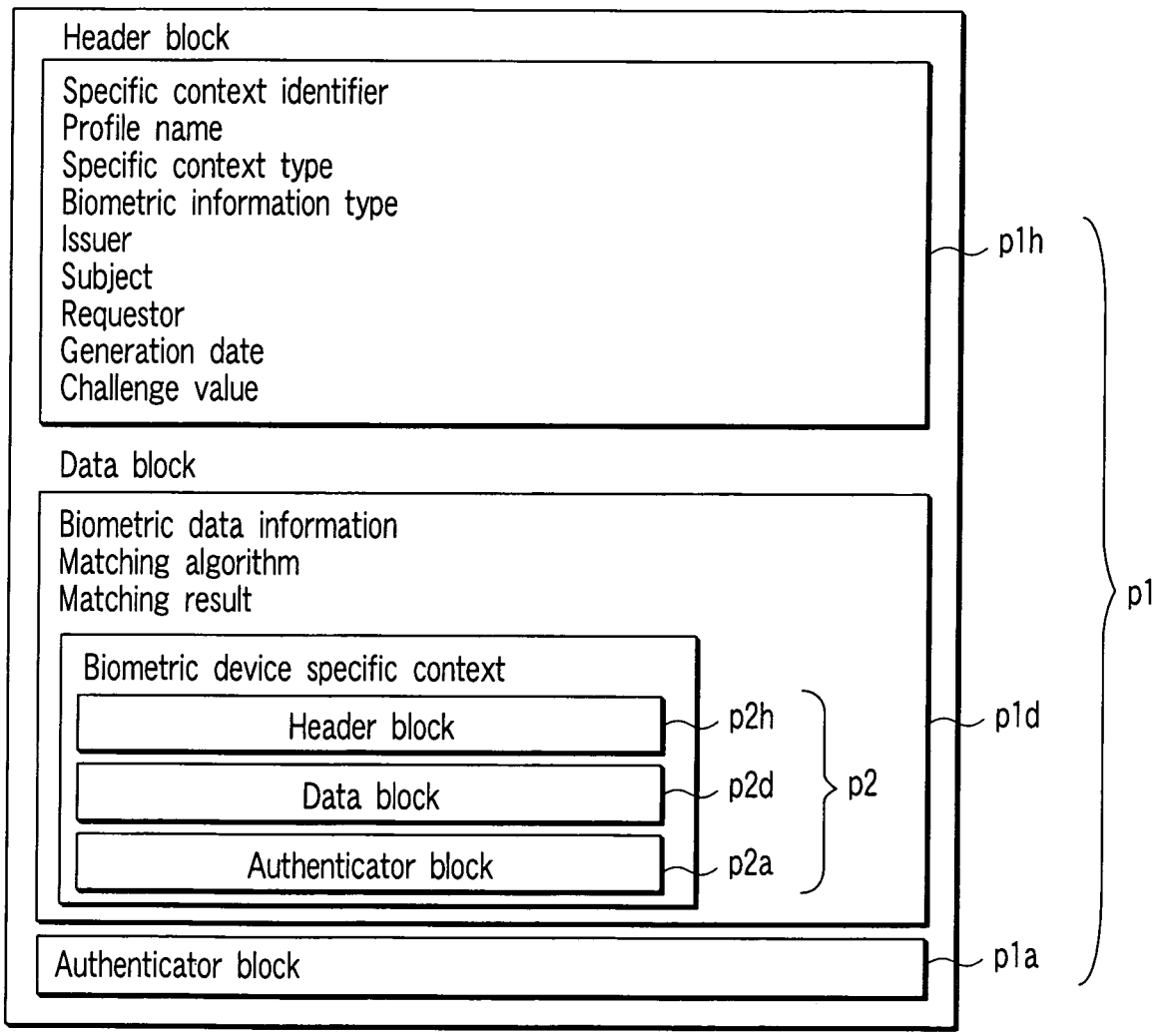
FIG. 20 is a schematic view showing a structure of a MOC specific context in the fourth embodiment.

Then, the context generating unit 15' generates an MOC specific context p1 formed in the structure shown in FIG. 20. The MOC specific context p1 includes the header block p1h, the data block p1d and the authenticator block p1a.

The header block p1h has a specific context identifier, a profile name, a specific context type, a biometric information type, a issuer, a subject, the requestor, the generation date, and the challenge value. The specific context identifier is the identifier which is assigned in order to uniquely identify the specific context. The specific context type is the information for identifying the type of the specific context. The issuer is the information for uniquely identifying the entity issuing the specific context. The subject is the information for uniquely identifying the entity receiving the specific context. The requester is the information for identifying the entity requesting the specific context. The generation date is the information indicating the date when the specific context is generated. The challenge value is the random numbers generated by the entity requesting the specific context.

The data block p1d has biometric data information, a matching algorithm, the matching result, and the biometric device specific context. The biometric data information includes the information concerning the biometric template used for the matching. The matching algorithm is one which is utilized in matching the biometric template and the biometric sample information. The matching result is the information indicating the result of the matching process.

The authenticator block p1a has the authenticator for assuring the data integrity of the biometric device specific context.

In order to associate the two specific contexts p1 and p2 with each other, as described above, the nesting structure or the parallel structure may be adopted. In the case of the nesting structure, as shown in FIG. 20, the biometric device specific context p2 may be included in the data block p1d of the MOC specific context p1. In the case of the parallel structure, as shown in FIG. 21, an associated specific context identifier (for example, biometric device identifier) for uniquely identifying the biometric device specific context p2 may be included in the MOC specific context p1.

The context generating unit 15' generates generate the header block p1h and the data block p1d of the MOC specific context P1 (ST13). The authenticator generating unit 14 generates the authenticator on the header block p1h and the data block p1d using the confidential information (ST14 and ST15). Finally, the context generating unit 15' forms the authenticator pursuant to the specific format. Therefore, the context generating unit 15' generates the authenticator block p1a including the authenticator. Then, the context generating unit 15' concatenates the authenticator block p1a to the header block p1h and data block p1d of Step ST13 to generate the MOC specific context P1 (ST16').

The generic context generating unit 16 generates the generic context g formed in the structure shown in FIG. 22 from the profile and MOC specific context.

The generic context g includes the header block gh and the authenticator block ga. The header block gh has version information, the issuer, the subject, the requester, the challenge value, generation time, a valid period, a profile list pfL, and a specific context list idL. The version information is the information of a version of the structure of the multimodal authentication context. The issuer is the information for uniquely identifying the entity issuing the generic context g. The requestor is the information for uniquely identifying the entity requesting the generic context g. The challenge value is the random numbers generated by the entity requesting the generic context g. The generation time is the information indicating the date when the generic context g is generated. The valid period is the information indicating a period in which the use of the generic context g is valid. The profile list pfL is the list of the profile corresponding to the specific context in the generic context g. The specific context list idL is the list of the identifier which uniquely identifies the specific contexts P1, P2, . . . , which exist in the generic context g.

The authenticator of the generic context in the authenticator block ga is the information for assuring the data integrity of the generic context.

The generic context generating unit 16 generates the header block gh of the generic context g (ST13G). The authenticator generating unit 14 reads the confidential information from the confidential information management unit 13 (ST14G). The authenticator generating unit 14 generates the authenticator on the header block gh of the generic context g and the whole of MOC specific context p1 using the confidential information (ST15G). However, in the case where the MOC specific context p1 is formed by the nesting structure, it is necessary that the biometric device specific context p2 is also included in the object of the authenticator. Finally, the generic context generating unit 16 forms the generated authenticator pursuant to the specific format. Therefore, the generic context generating unit 16 generates the authenticator block ga including the authenticator. Then, the generic context generating unit 16 concatenates the authenticator block ga to the header block gh to generate the generic context g (ST16G).

The user information management device 10' transmits the generic context g and the specific contexts p1 and p2 as the authentication context ac to the server device 30' (ST17).

The operation of the server device 30' is similar to the operation of the verification device 30 of the second embodiment.

As described above, according to the fourth embodiment, the first to third embodiments can be applied to the biometrics to obtain the same effect as for the first to third embodiments.

Fifth Embodiment

A fifth embodiment is a modification of the fourth embodiment. The fifth embodiment is an authentication system (hereinafter referred to as STOC (Store On Card) model) in which the biometric device 20' has the matching function instead of the user information management device 10'.

Biometric Device Process

The user information management device 10' transmits the biometric device process execution request including a biometric template to the biometric device 20'.

The biometric device 20' performs the matching between the received biometric template and the captured biometric sample information. Then, the biometric device 20' generates the biometric device specific context p2, formed in the structure shown in FIG. 23, using the matching result. The biometric device 20' transmits the biometric device specific context p2 to the user information management device 10'.

Figure 24:
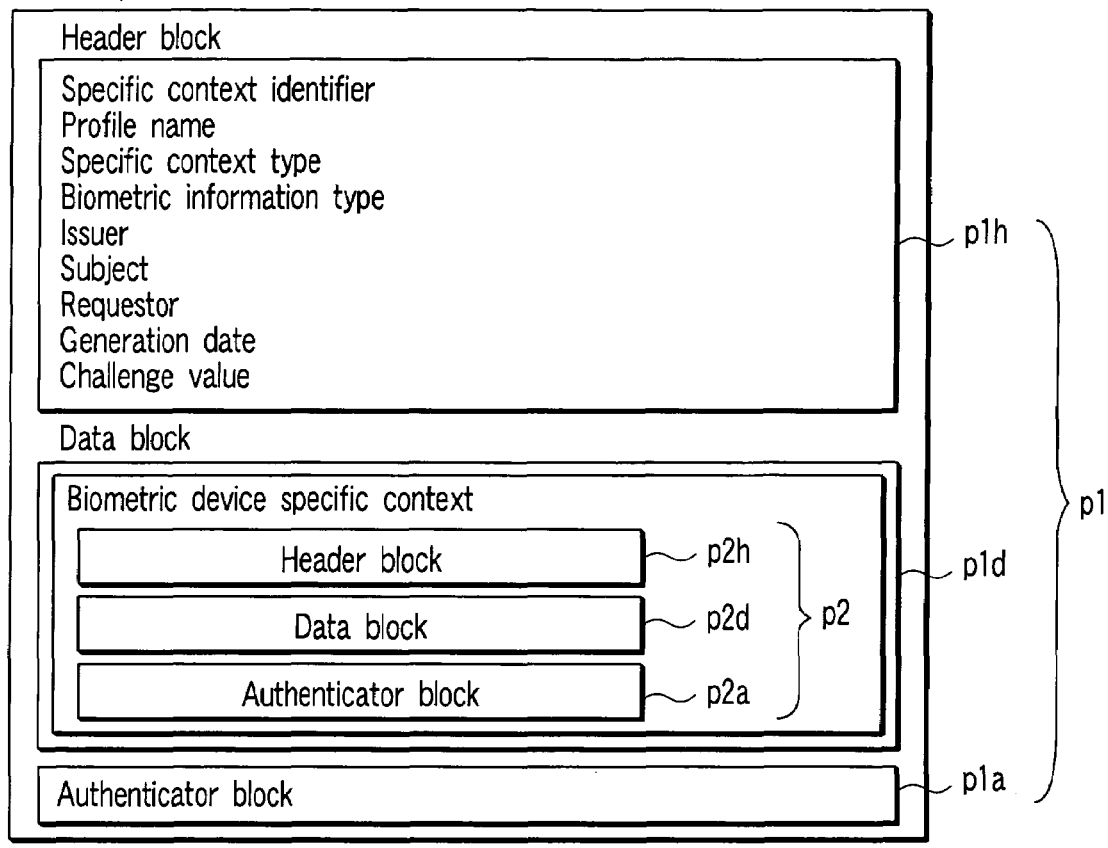
FIG. 24 is a schematic view showing a structure of a STOC specific context in the fifth embodiment.

The user information management device 10' generates the STOC specific context p1 formed in the structure shown in FIG. 24 from the received biometric device specific context p2, and the user information management device 10' transmits the obtained STOC specific context p1 to the server device 30'.

As described above, according to the fifth embodiment, the fourth embodiment can be applied to the STOC model.

Sixth Embodiment

Figure 25:
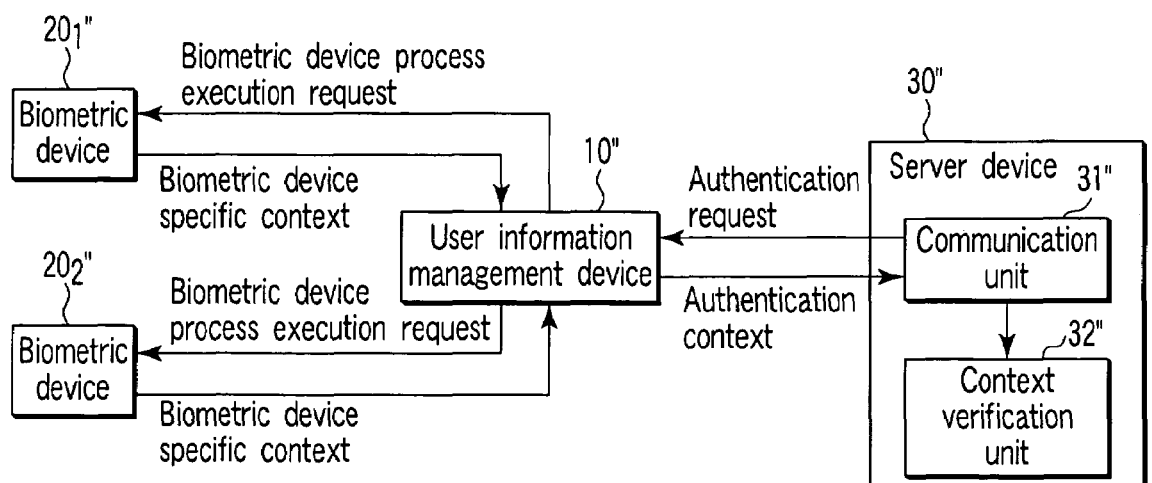
FIG. 25 is a block diagram showing a configuration of an authentication system according to a sixth embodiment of the invention.

A sixth embodiment is another modification of the fourth embodiment. As shown in FIG. 25, the sixth embodiment is an authentication system (hereinafter referred to as multimodal system) including at least two biometric devices $20_1''$, $20_2''$, . . . .

Multimodal biometic authentication should mean the biometric authentication in which the higher-accuracy biometric authentication can be realized by fusing the matching results of at least two types of biometric information to make the decision.

User Information Management Device Flow

Figure 26:
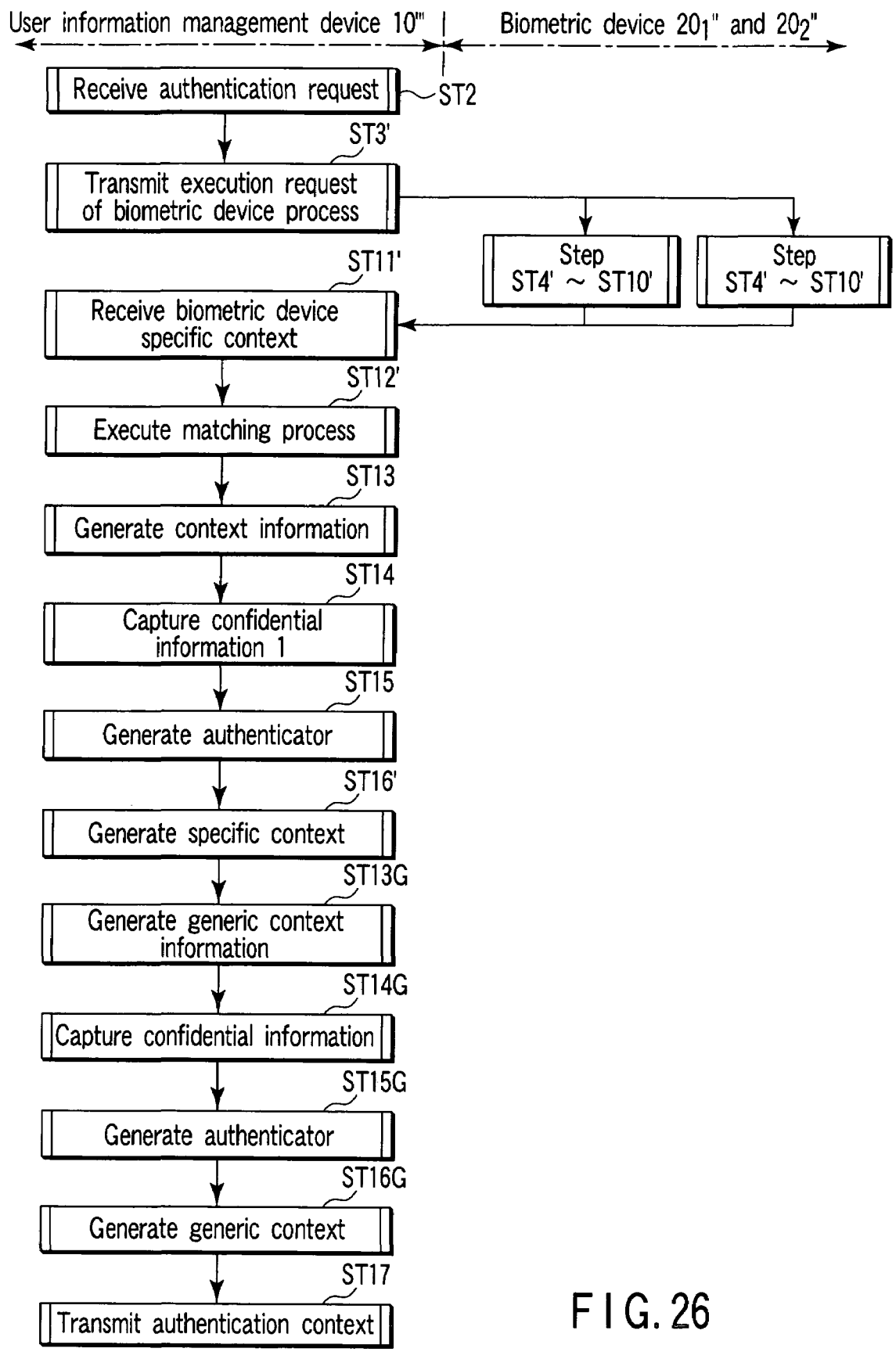
FIG. 26 is a flowchart for explaining an operation of a user information management device in the sixth embodiment.

FIG. 26 shows the flowchart for explaining the operation in a user information management device 10". In this case, the biometric device process execution request is transmitted to the two biometric device $20_1''$ and $20_2''$. As shown in FIG. 27, the matching process executing unit 12' executes the two matching processes in parallel (ST127-1 to ST12'-3), the two matching results are fused (ST12'-4), and the result of the fusion is outputted (ST12'-5). In addition to the method of fusing the plural matching results in parallel, the fusion technology in the multimodal authentication includes the method of fusing the matching results in series. In the case of the in-series fusion, the specific context is generated for each matching process, and thereby the authentication context assuring each authentication process can be generated.

Figure 28:
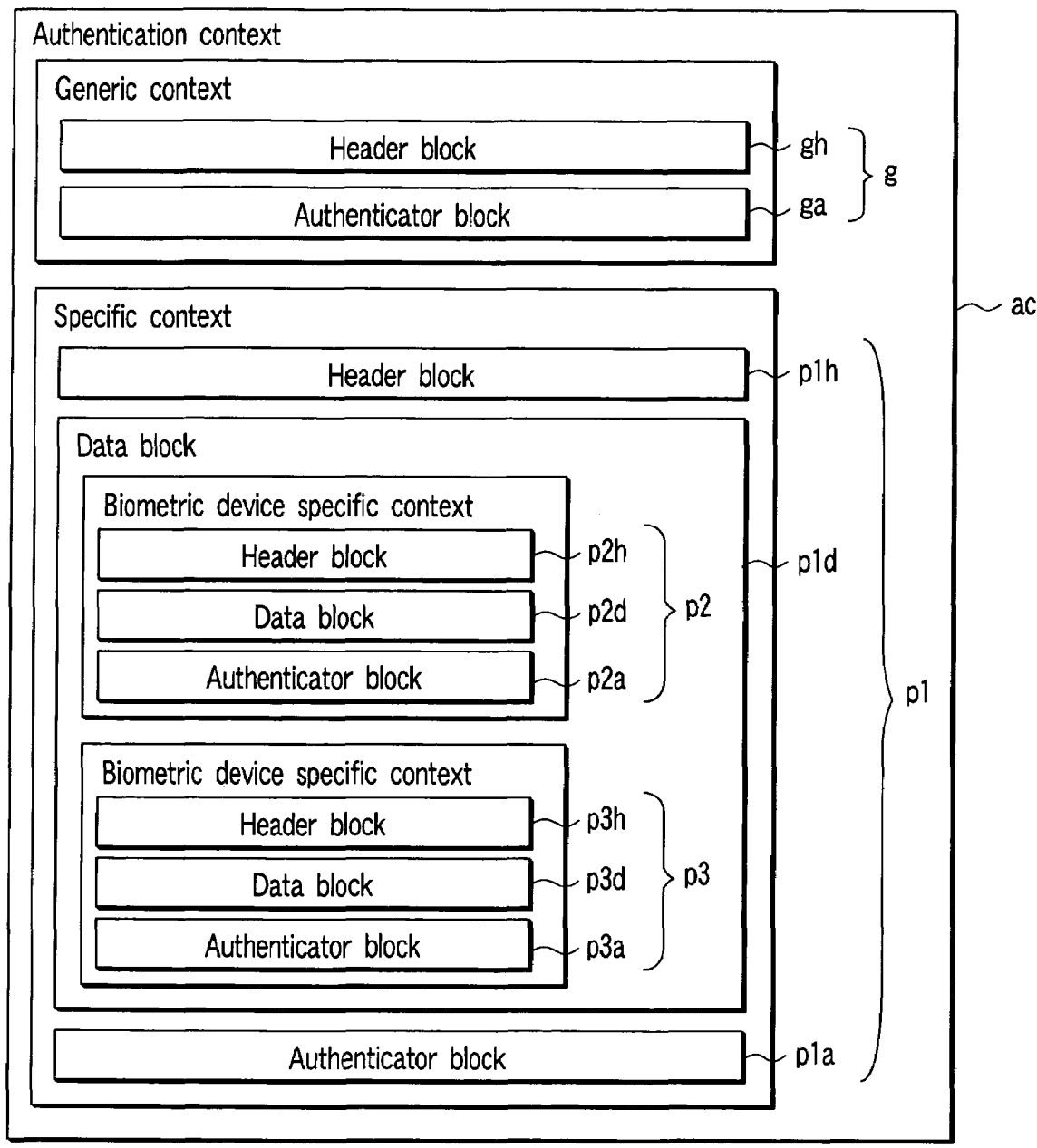
FIG. 28 is a schematic view showing a relationship between specific contexts in the sixth embodiment.
Figure 29:
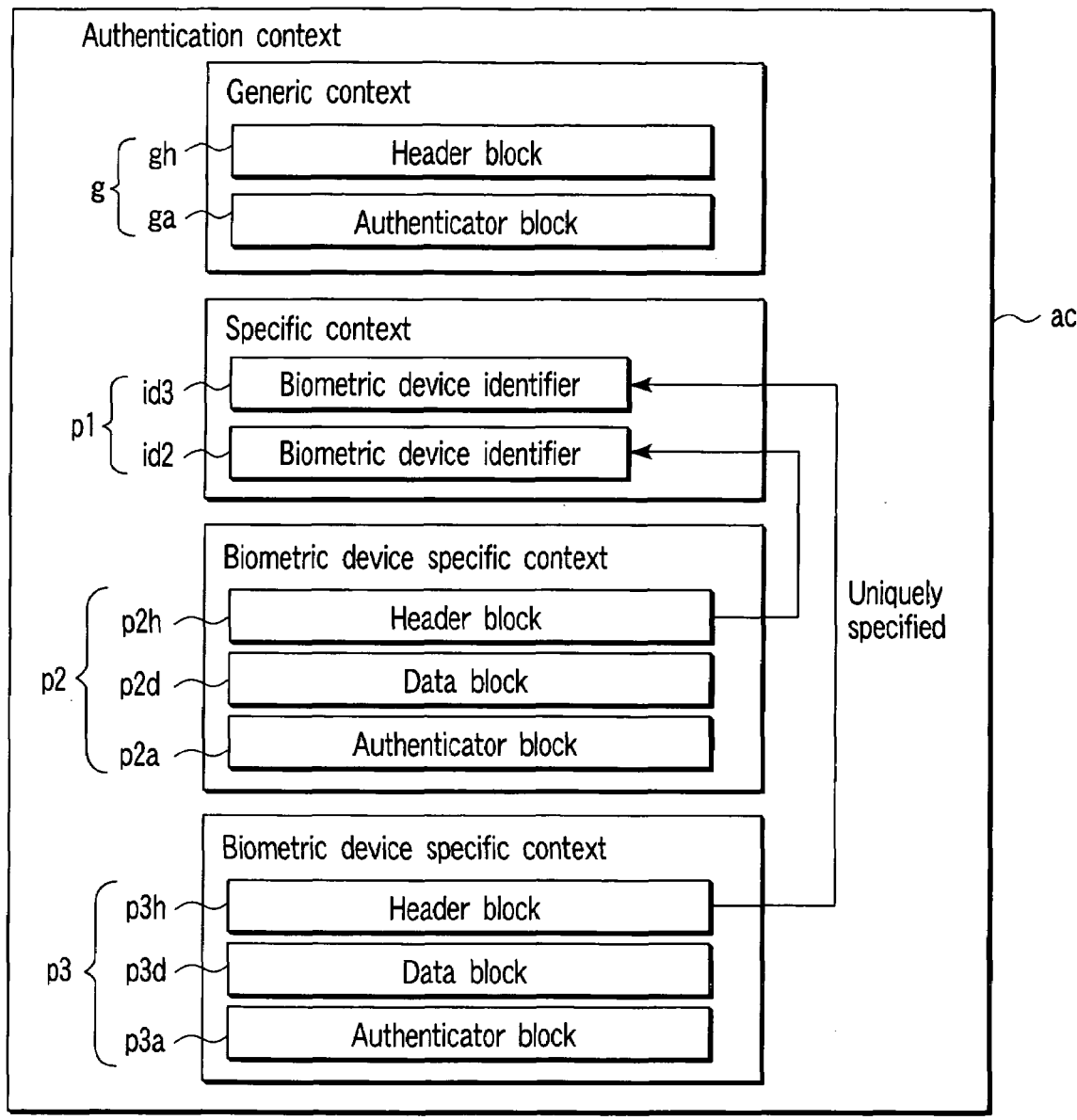
FIG. 29 is a schematic view showing the relationship between the specific contexts in the sixth embodiment.

In the case where a server device 30" verifies each authentication process in the multimodal system, it is necessary that the association of the authentication processes is performed in the authentication context. As shown in FIG. 28, in the authentication context ac formed in the nesting structure, the association of the authentication processes can be realized by the specific contexts P1, P2, and P3 having the nesting structures. As shown in FIG. 29, in the authentication context ac formed in the nesting structure including the parallel structure, the higher structure holds the reference information of the lower structure, which allows the hierarchical structure to be realized among the specific contexts P1, P2, and P3. Therefore, the association of the authentication processes can be realized.

The sixth embodiment is applied to the profile in which the biometric device $20_1"$ and $20_2"$ do not perform the matching process. However, the sixth embodiment is not limited to the above profile, but the sixth embodiment can also be applied to the profile in which the biometric device $20_1"$ and $20_2"$ perform the matching processes in several and the matching results are fused in the user information management device 10".

As described above, according to the sixth embodiment, the fourth embodiment can be applied to the multimodal biometric authentication.

Seventh Embodiment

A seventh embodiment is a modification of the first to sixth embodiments, and the seventh embodiment shows an example in which the profile concerning the authentication system is used.

As shown in FIG. 30, in the seventh embodiment, the profile can be negotiated between authentication system entity devices (hereinafter referred to as authentication entity device) 10e, $20_1e$, and $20_2e$ and a client device 40. The authentication entity devices 10e, $20_1e$, and $20_2e$ correspond to the user information management devices 10, 10', and 10" and the biometric device 20, 20', and 20". The client device 40 corresponds to the authentication system entity substituting device for which the authentication entity device is substituted.

The profile defines the authentication system entity configuration which executes the authentication process, the deployment state of the authentication subprocesses in the authentication system entities, the protocol between authentication system entities, a security enforcement specification, and the like.

In the seventh embodiment shows an example including the client device 40 as the authentication system entity substituting device which can organize the profile compatible with the client environment. The client device 40 has no authentication subprocess, and the client device 40 transfers between the authentication entity devices 10e, $20_1e$, and $20_2e$ and the verification device 30 or between the authentication entity device 10e and the authentication entity devices $120_1e$ and $20_2e$.

The client device 40 is connected to one or more authentication entity devices 10e, $20_1e$, and $20_2e$. The client device 40 transfers the communication among the authentication entity devices 10e, $20_1e$, and $20_2e$ to perform a process of handling the whole authentication process. For example, a general-purpose personal computer and a handheld instrument can be applied to the client device 40.

Specifically, as shown in FIG. 30, the client device 40 includes the communication unit 41, a control unit 42, a profile query unit 43, and a profile management unit 44.

The communication unit 41 conducts the communication with the external device.

The control unit 42 performs the process of handling the whole authentication process.

The profile query unit 43 asks the profile compatible with each of the authentication entity devices 10e, $20_1e$, and $20_2e$.

The profile management unit 44 manages the profile compatible with the client environment.

Although not shown in the drawing, the authentication entity devices 10e, $20_1e$, and $20_2e$ have the each of the units 11 to 17, and 21 to 25 in the first to sixth embodiments, and the authentication entity devices 10e, $20_1e$, and $20_2e$ further include profile response units 18e and 26e. Sometimes the authentication entity devices 10e, $20_1e$, and $20_2e$ include the specific context verifying units 19 and 29, and sometimes the authentication entity devices 10e, $20_1e$, and $20_2e$ do not include the specific context verifying units 19 and 29. The profile response units 18e and 26e respond the query of the profile from the client device 40.

Figure 31:
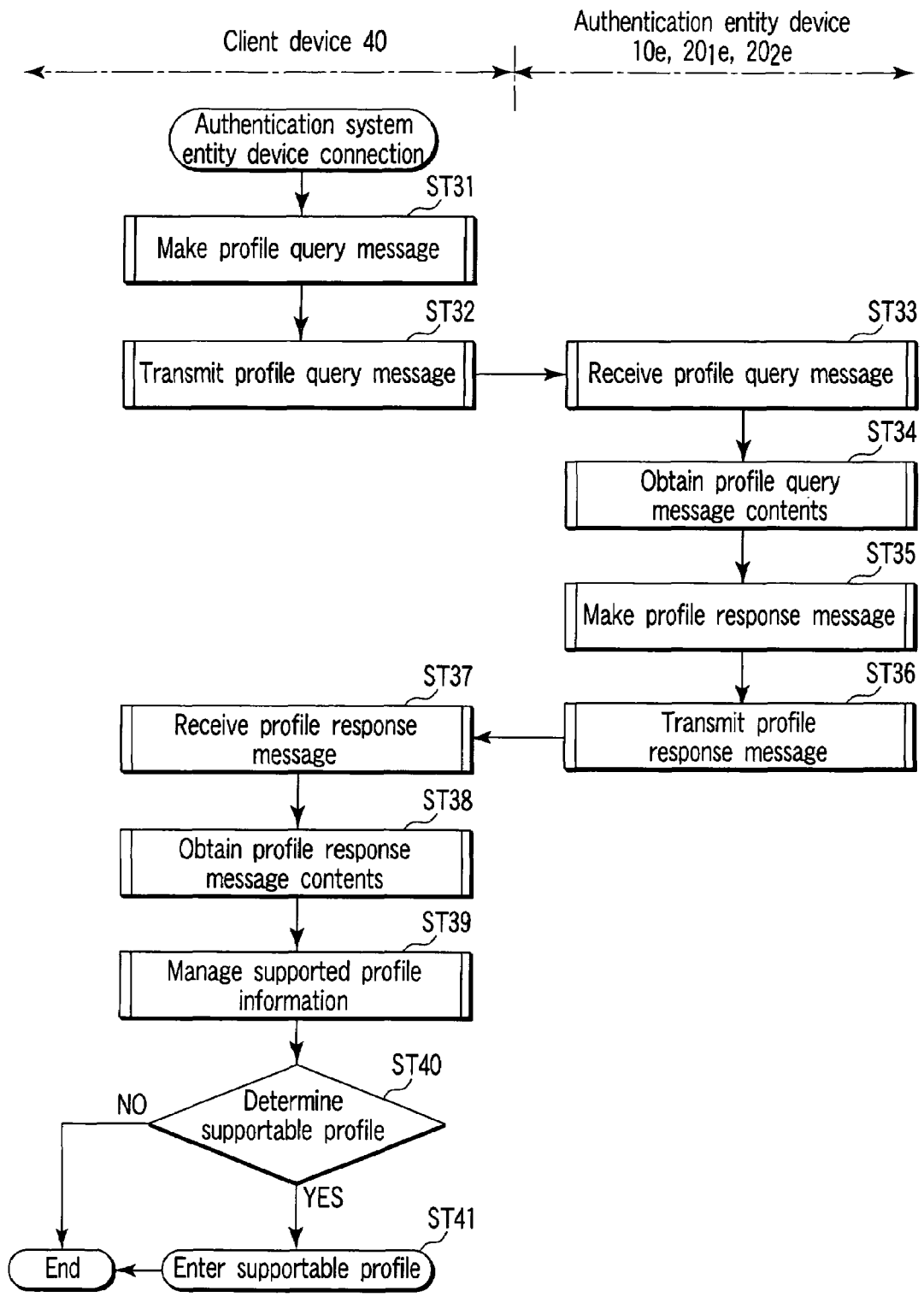
FIG. 31 is a flowchart for explaining an operation in the seventh embodiment.

An example of a profile negotiating process is shown in the following steps. At the stage in which the authentication entity devices 10e, $20_1e$, and $20_2e$ are newly connected to the client device 40, it is desirable that the client device 40 performs the following steps to each of the authentication entity devices 10e, $20_1e$, and $20_2e$. FIG. 31 shows a process flow of the following steps. For the sake of simplification, in FIG. 31, a profile query message and a profile response message are described as a profile negotiation message (query/response).

The client device 40 makes the profile query message (ST31), and the client device 40 transmits the obtained profile query message to the authentication entity devices 10e, $20_1e$, and $20_2e$ (ST32).

The authentication entity devices 10e, $20_1e$, and $20_2e$ receive the profile query message (ST33), and the authentication entity devices 10e, $20_1e$, and $20_2e$ obtain the content of the query (ST34). Then, the authentication entity devices 10e, $20_1e$, and $20_2e$ make the profile response message (ST35). The profile response message includes the profile with which the authentication entity devices 10e, $20_1e$, and $20_2e$ are compatible and the mounted authentication subprocess. Then, the authentication entity devices 10e, $20_1e$, and $20_2e$ send the obtained profile response message back to the client device 40 (ST36).

The client device 40 receives the profile response message using the communication unit 41 (ST37). The contents of the profile response message are transmitted to the profile management unit 44 through the control unit 42 (ST38).

The profile management unit 44 manages the response contents from each of the authentication entity devices 10e, $20_1e$, and $20_2e$ as supported profile information (ST39). It is desirable that the supported profile information is managed in correspondence with the authentication entity devices 10e, $20_1e$, and $20_2e$.

The client device 40 determines the profile with which the client environment is compatible from the supported profile information managed (ST40). As a result of the determination, the client device 40 registers the compatible profile in the profile management unit 44 (ST41).

The case, in which the authentication entity devices 10e, $20_1e$, and $20_2e$ capable of performing the profile are provided, is adopted as the criteria whether the profile is compatible or not in the seventh embodiment. However, the criteria may include other determination elements. In this case, the query contents of the determination element may be included in the profile query message.

The client device 40 verifies the connection of each of the authentication entity devices 10e, $20_1e$, and $20_2e$ at predetermined time intervals. In the case of the disconnection, it is desirable that the supported profile information and the compatible profile are deleted in the profile management unit 44. In the case where alternative supported profile information exists, the compatible profile may not be deleted.

An example of the process, in which the verification device specifies the profile to the client environment, in the case where the authenticator is the digital signature will be described below.

Figure 32:
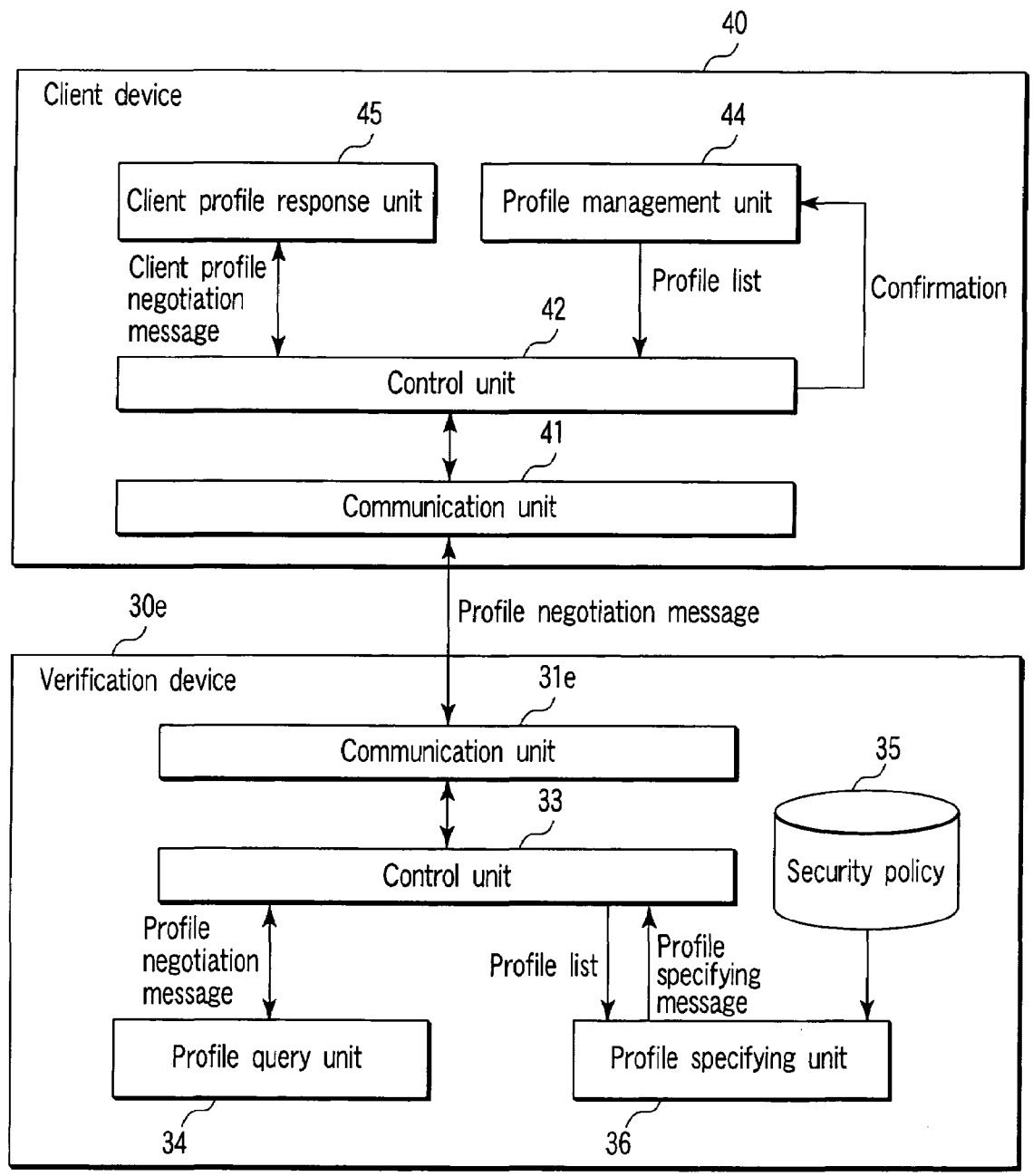
FIG. 32 is a block diagram showing a partial configuration of the authentication system in the seventh embodiment.

FIG. 32 is a view showing a system concept and functional block configuration of the client device and the verification device with respect to the profile specifying process in the seventh embodiment.

Although not shown in the drawing, a verification device 30*e* has the functions of the units 31 and 32 in the first to sixth embodiments. The verification device 30*e* further includes a client profile query unit 34, a memory unit 35, and a client profile specifying unit 36. The client profile query unit 34 asks the profile which can be performed in the client environment. A security policy is stored in the memory unit 35.

The client profile specifying unit 36 specifies the profile which is performed in the client environment. The security policy is the information which becomes the criteria in specifying the profile. In the seventh embodiment, any mode of the security policy can be used. However, it is desirable that the security policy has a list format in which the profile being able to be specified has a higher priority.

In the client environment of the seventh embodiment, as with the above case, the client device 40 performs the transfer substitution between the authentication entity devices 10*e*, 20$_1$*e*, and 20$_2$*e* and the verification device 30*e*. However, the invention is not limited to the seventh embodiment, but a modification may be made such that the authentication entity devices 10*e*, 20$_1$*e*, and 20$_2$*e* and the verification device 30*e* directly negotiate with each other.

In addition to the units 41 to 44, the client device 40 includes a client profile response unit 45. The client profile response unit 45 answers a profile query from the verification device 30.

Figure 33:
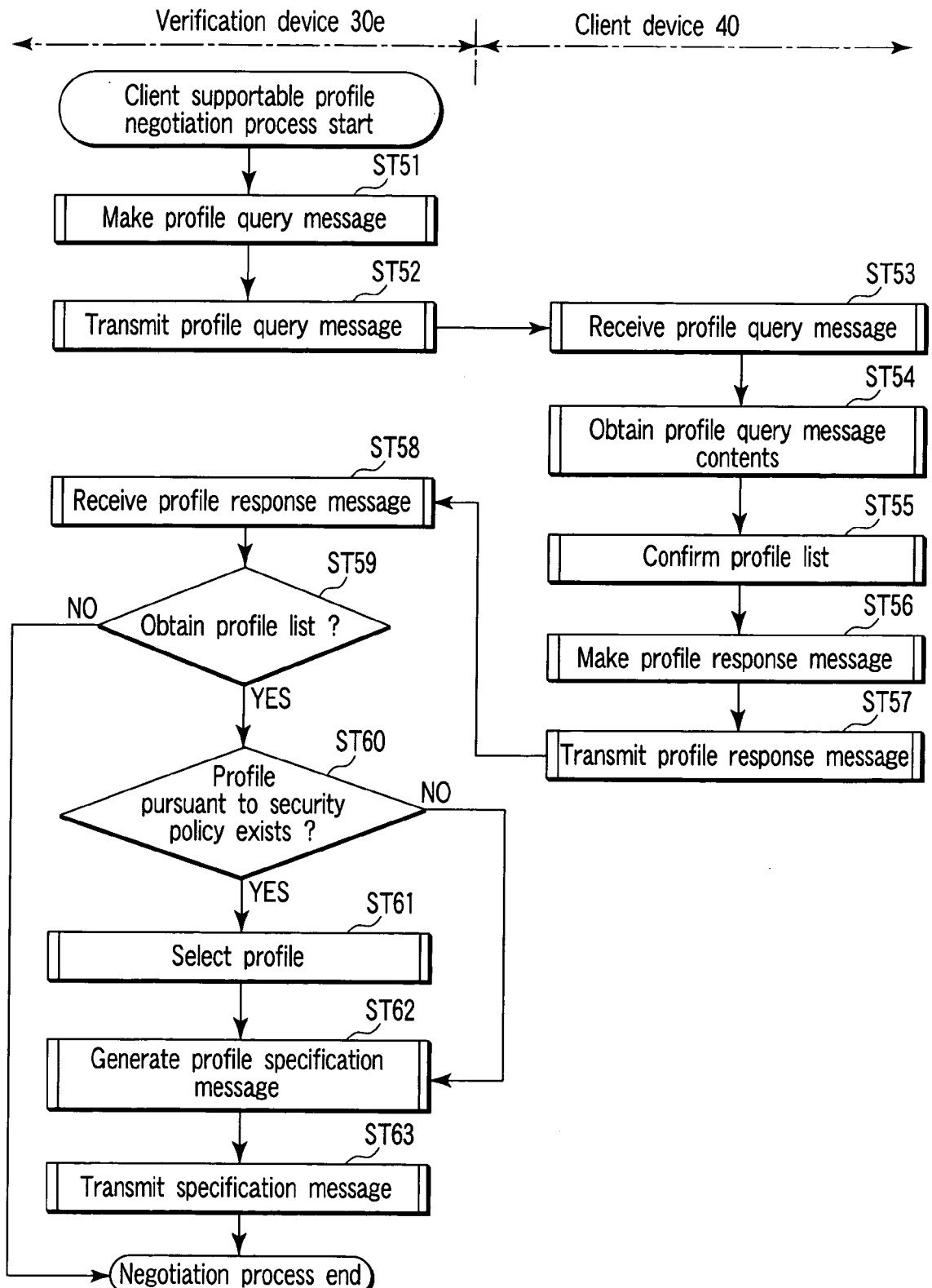
FIG. 33 is a flowchart for explaining an operation in the seventh embodiment.

An example of the profile specifying process, in which the verification device 30 specifies the profile, will be described in the following steps. It is assumed that the profile specifying process in the client environment is previously performed like the process steps ST31 to ST 41. FIG. 33 shows the process flow of the following steps. For the sake of the simplification, in FIG. 33, a client profile query message, a client profile response message, and a profile specifying message are described as a client profile negotiation message.

The verification device 30*e* makes the profile query message for asking whether the profile being able to be performed exists or not (ST51), and the verification device 30*e* transmits the obtained profile query message to the client device 40 (ST52).

The client device 40 receives the profile query message (ST53), and the client device 40 obtains the query contents (ST54). Then, the client device 40 confirms the compatible profile list in the profile management unit 44 (ST55), and the client device 40 makes the profile response message including the confirmation result (ST56).

In the case where the plural compatible profiles exist, the profile response message includes the compatible profile list. In the case where the compatible profile does not exist, the profile response message includes that the profile compatible with the client environment does not exist.

In either case, the client device 40 transmits the profile response message to the verification device 30*e* (ST57). In the case where the profile response message includes that the compatible profile does not exist, the process is ended. In the following steps, the case in which the profile response message includes the compatible profile list will be described.

The verification device 30*e* receives the client profile response message (ST58), and the verification device 30*e* obtains the compatible profile list (ST59; YES). When the compatible profile list does not exist (ST59; NO), the process is ended.

The verification device 30*e* determines whether the profile list with which the client environment is compatible exists or not using the profile specifying unit 36 (ST60). When the profile list exists (ST60; YES), the verification device 30*e* selects the profile corresponding to the security policy from the profile list (ST61), and the verification device 30*e* generates the profile specifying message for specifying the profile (ST62). When the profile suitable to the security policy does not exist in the profile list (ST60; NO), the verification device 30*e* generates the profile specifying message including that the profile does not exist (ST62).

In either case, the verification device 30*e* transmits the generated profile specifying message to the client device 40 (ST63).

The client device 40 receives the profile specifying message to confirm the profile to be performed.

Subsequent to the step, it is desirable that each of the first to sixth embodiments is performed. In this case, based on the confirmed profile, the client device 40 transmits the authentication request to the authentication entity devices 10*e*, 20$_1$*e*, and 20$_2$*e* having the corresponding profile using the control unit 42. Then, the client device 40 causes the authentication entity devices 10*e*, 20$_1$*e*, and 20$_2$*e* to perform the authentication subprocess.

During executing the authentication subprocess, the client device 40 may not perform the transfer substitution of the communication among the authentication entity devices 10*e*, 20$_1$*e*, and 20$_2$*e*.

As described above, according to the seventh embodiment, in addition to the effects of the first to sixth embodiments, before the authentication subprocess is executed, the profile with which the client environment is compatible is registered among the profiles of the authentication subprocesses in each of the authentication entity devices 10*e*, 20$_1$*e*, and 20$_2$*e*. Therefore, the agreement between the client environment and the profile can be established.

Before the authentication subprocess is executed, the verification device 30" specifies the profile in client device 40, so that the authentication subprocess can be executed on the initiative of the verification device 30".

The technique described in the above embodiments can be stored in the storage medium as the program which the computer can be caused to execute. The program can be distributed in the form of the storage medium such as magnetic disks (floppy disk (trademark), hard disk drive, and the like), optical disks (CD-ROM, DVD, and the like) and semiconductor memories.

Any storage medium can be used as long as the program can be stored and the program can be read by the computer.

OS (Operating System) or MW (Middleware) such as database management software and network software, running on the computer, may execute a part of the process for realizing the embodiments based on the direction of the program installed in the computer from the storage medium.

The storage medium in the invention is not limited to the medium separated from the computer, but the storage medium in which the program transmitted through LAN or the Internet is downloaded and stored or temporarily stored is also included in the invention.

The number of storage mediums is not limited to one. The case in which the process in the invention is executed from the plural mediums is also included in the storage medium in the invention. The medium may have any configuration.

The computer in the invention is one which executes each process in the embodiments based on the program stored in the storage medium. The computer may be either one device including the personal computer and the like or the system in which the plural devices are connected through the network.

The computer in the invention is not limited to the personal computer, but the computer includes a processor included in the information processing instrument, a microcomputer, and the like. The computer in the invention is the general term for the instruments and devices in which the function of the invention can be realized by the program.

The invention is not limited to the above-described embodiments. In the achievement stage, modifications could be realized by changing the constituents without departing from the scope of the invention. Further, various changes and modifications could be made by the proper combination of the plural constituents disclosed in the above embodiments. For example, some constituents may be eliminated from all the constituents shown in the above embodiments. Further, the constituents in the different embodiments may appropriately be combined.

What is claimed is:

1. An authentication entity device used in an authentication system comprising a plurality of authentication entity devices which separately execute authentication subprocesses, the authentication subprocess constituting an authentication process, and a verification device which verifies the authentication process executed by the each authentication entity device, the authentication entity device comprising:
    a confidential information memory module configured to store confidential information for verification by the verification device;
    an authenticator generating module configured to generate an authenticator corresponding to executed contents of the authentication subprocess, the authenticator being generated using the confidential information;
    a specific context generating module configured to generate a specific context data, the specific context data including a header block, a data block containing the executed contents of the authentication subprocess, and an authenticator block including the generated authenticator; and
    a specific context output module configured to output the specific context data.

2. The authentication entity device according to claim 1, further comprising:
    an overall authenticator generating module configured to generate an overall authenticator based on a plurality of specific contexts using the confidential information, the plurality of specific contexts being outputted from other authentication entity devices in association with the authentication process;
    a generic context generating module configured to generate a generic context pursuant to the specific format from the overall authenticator and the plurality of specific contexts; and
    a generic context output module configured to output the generic context to the verification device.

3. The authentication entity device according to claim 1, further comprising a specific context verifying module configured to verify the specific context inputted from other authentication entity devices using the confidential information.

4. The authentication entity device according to claim 1, further comprising a context information associating module configured to generate the specific context of the authentication entity device in order to express a hierarchical structure between specific contexts associated with dependence of the authentication subprocess such that the specific context of the authentication entity device includes the specific contexts inputted from other authentication entity devices.

5. The authentication entity device according to claim 4, further comprising:
    a transmission module configured to transmit the execution request to the other authentication entity device based on the execution request of the authentication process transmitted from the verification device such that the other authentication entity device executes the corresponding authentication subprocess; and
    an authentication response module configured to send back the specific context replied from the other authentication entity device and at least the specific context generated by the authentication entity device.

6. The authentication entity device according to claim 1, further comprising a context information associating module configured to generate the specific context of the authentication entity device in order to express a hierarchical structure between specific contexts associated with dependence of the authentication subprocess such that the specific context of the authentication entity device includes reference information of the specific contexts inputted from other authentication entity devices.

7. The authentication entity device according to claim 1, wherein the confidential information memory module has a private key memory unit configured to store a private key in a public key cryptography as the confidential information, and
    the authenticator generating module comprises a signature generating unit configured to generate the authenticator as a digital signature in the public key cryptography using the private key.

8. A verification device which verifies a authentication process executed by each of a plurality of authentication entity devices which separately executes an authentication subprocess constituting the authentication process, the verification device comprising:
    a context verifying module configured to verify a plurality of contexts using confidential information identical to the confidential information or corresponding confidential information;
    the plurality of contexts being generated by the plurality of authentication entity devices, wherein each of the plurality of authentication entity devices separately executes an authentication subprocess to generate a specific context for each of the plurality of authentication entity devices; and
    the plurality of contexts including execution contents of the authentication subprocess corresponding to a particular authentication entity device, and an authenticator generated for the execution contents using predetermined confidential information stored on the particular authentication entity device.

9. A client device which transfers communication between a plurality of authentication entity devices and a verification device, the plurality of authentication entity devices separately executing a authentication subprocess constituting an authentication process, the verification device verifying the authentication process executed by the each authentication entity device, the client device comprising:
    a profile query module configured to transmit a request for profiles to each of the plurality of authentication entity devices, the profiles defining execution environment contents of the authentication subprocess executing on each of the plurality of authentication entity devices;

a profile management module configured to store the profiles received from each of the plurality of authentication entity devices; and a control module configured to determine one of the profiles compatible with a client environment of the client device.

10. The client device according to claim 9, further comprising a control module configured to cause each of the plurality of authentication entity devices having a corresponding profile matching a profile specified from the verification device to execute the authentication subprocess based on the profile.

* * * * *

UNITED STATES PATENT AND TRADEMARK OFFICE
CERTIFICATE OF CORRECTION

PATENT NO. : 7,770,207 B2
APPLICATION NO. : 11/165276
DATED : August 3, 2010
INVENTOR(S) : Okada et al.

It is certified that error appears in the above-identified patent and that said Letters Patent is hereby corrected as shown below:

Claim 1, column 21, line 42, change "a specific" to --specific--.

Claim 8, column 22, line 37, change "a authentication" to --an authentication--.

Claim 9, column 22, line 61, change "a authentication" to --an authentication--.

Signed and Sealed this
Twenty-ninth Day of January, 2013

David J. Kappos
*Director of the United States Patent and Trademark Office*